(12) United States Patent
Matsubara et al.

(10) Patent No.: US 6,463,375 B2
(45) Date of Patent: Oct. 8, 2002

(54) AUTOMATIC START CONTROLLING APPARATUS OF INTERNAL COMBUSTION ENGINE AND DETECTOR FOR DETECTING ENGAGEMENT OF CLUTCH

(75) Inventors: Tooru Matsubara, Toyota; Yasuo Hojo; Hideo Tomomatsu, both of Nagoya; Tadasu Tomohiro; Yoshikazu Tanaka, both of Toyota; Katsumi Nakatani, Aichi-ken, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/915,548

(22) Filed: Jul. 27, 2001

(65) Prior Publication Data

US 2002/0019691 A1 Feb. 14, 2002

(30) Foreign Application Priority Data

Aug. 2, 2000 (JP) .......................... 2000-234480
Jun. 15, 2001 (JP) .......................... 2001-182146

(51) Int. Cl.$^7$ .............................................. G06F 17/00
(52) U.S. Cl. .............................. 701/54; 701/51; 701/67; 477/74; 477/77; 477/86; 477/180
(58) Field of Search .............................. 701/51, 54, 67, 701/87; 477/74, 77, 86, 107, 109, 166, 180

(56) References Cited

U.S. PATENT DOCUMENTS 5,337,868 A * 8/1994 Liu et al. .................... 477/74
5,904,635 A * 5/1999 Genise et al. ............... 477/111

FOREIGN PATENT DOCUMENTS

| JP | A 08-014076 | 1/1996 |
| JP | A 08-193531 | 7/1996 |
| JP | A 09-071138 | 3/1997 |
| JP | A 11-147424 | 6/1999 |
| JP | A 2000-153726 | 6/2000 |

* cited by examiner

Primary Examiner—Gertrude Arthur
(74) Attorney, Agent, or Firm—Oliff & Berridge, PLC

(57) ABSTRACT

An automatic start controlling apparatus for automatically starting an internal combustion engine. A transmission is coupled to the engine. The transmission has a clutch, which is actuated by an oil pump other than the engine when the engine stops. The transmission has an input shaft and an output shaft. The input shaft is connected to the engine. The automatic start controlling apparatus has a controller. When the engine is automatically started, the controller detects whether the clutch is completely engaged. When the controller judges that the clutch is partially engaged, the controller reduces the output torque of the engine or limits an increase of the output torque.

38 Claims, 14 Drawing Sheets

| Shift Position | | C0 | C1 | C2 | B0 | B1 | B2 | B3 | B4 | F0 | F1 | F2 |
|---|---|---|---|---|---|---|---|---|---|---|---|---|
| P | | ○ | | | | | | | | ○ | | |
| R (Vehicle not Moving) | | ○ | | ○ | | | | | ○ | ○ | | |
| R (Vehicle Moving) | | | | ○ | ○ | | | | ○ | | | |
| N | | ○ | | | | | | | | ○ | | |
| D | First | ○ | ○ | | | | | | ◎ | ○ | | ○ |
| | Second | ◎ | ○ | | | | | ○ | | ○ | | |
| | Third | ○ | ○ | | ◎ | ○ | | | | ○ | ○ | |
| | Fourth | ○ | ○ | ○ | | | △ | | | ○ | | |
| | Fifth | | ○ | ○ | ○ | | △ | | | | | |

○ Engaged    ◎ Engage During Engine Braking    △ Engaged But Not Serving For Power Transmission

AUTOMATIC START CONTROLLING APPARATUS OF INTERNAL COMBUSTION ENGINE AND DETECTOR FOR DETECTING ENGAGEMENT OF CLUTCH

BACKGROUND OF THE INVENTION

The present invention relates to an automatic start controlling apparatus and a detector for detecting engagement of a clutch of an internal combustion engine. Particularly, the present invention pertains to an automatic start controlling apparatus and a clutch engagement detector of an internal combustion engine having a transmission that includes a clutch actuated by a drive source other than the engine when the engine is not running.

Japanese Unexamined Patent Publication No. 9-71138 discloses an economy running system. The system automatically stops the engine when the vehicle stops, for example, at an intersection, and automatically starts the engine by actuating a starter when the vehicle is started. The system includes an automatic transmission that has a clutch.

To quickly start the vehicle after the engine is automatically stopped by the system, the automatic transmission is preferably engaged when the engine is not running. That is, the automatic transmission preferably receives hydraulic pressure regardless of whether the engine is running. The system disclosed in Japanese Unexamined Patent Publication No. 11-147424 has a battery powered electric oil pump, which generates hydraulic pressure and applies the pressure to an automatic transmission. The system disclosed in Japanese Unexamined Patent Publication No. 8-14076 includes an accumulator, which stores hydraulic pressure to maintain a clutch engaged so that the vehicle can be quickly started after an automatic stop procedure.

Even if an economy running system has an electric oil pump or an accumulator, the clutch engagement may be inadequate after the engine is automatically stopped. For example, if air is caught in the oil, if the oil pump is frozen or if a conducting wire is broken, a sufficient hydraulic pressure cannot be generated and sufficient engagement of the clutch cannot be maintained.

If the engagement of the clutch is insufficient after the engine is automatically stopped, the pump of the automatic transmission starts applying sufficient hydraulic pressure to the clutch when the engine is started, which suddenly engages the clutch. The sudden engagement of the clutch creates shock and thus disturbs the driver. Particularly, if the clutch is suddenly engaged after the driver steps on the acceleration pedal, a relatively great shock is created.

BRIEF SUMMARY OF THE INVENTION

Accordingly, it is an objective of the present invention to provide an automatic start controlling apparatus for an internal combustion engine having an automatic transmission that reduces shock when the clutch is engaged. Another objective is to provide a detector that detects the engagement of the clutch without any additional sensor.

To achieve the above objective, the present invention provides an automatic start controlling apparatus for automatically starting an internal combustion engine coupled to a transmission. The transmission has an input shaft connected to the engine, an output shaft, and a clutch located between the input and output shafts. The clutch is engaged to transmit the output torque of the engine from the input shaft to the output shaft. The clutch is actuated by a drive source other than the engine when the engine stops. The automatic start controlling apparatus has a controller. When the engine is automatically started, the controller detects whether the clutch is completely engaged. When the controller judges that the clutch is partially engaged, the controller reduces the output torque of the engine or limits an increase of the output torque.

The present invention also provides an automatic start controlling apparatus for automatically starting an internal combustion engine coupled to a transmission. The transmission has an input shaft connected to the engine, an output shaft, and a clutch located between the input and output shafts. The clutch is engaged to transmit the output torque of the engine from the input shaft to the output shaft. The clutch is actuated by a drive source other than the engine when the engine stops. The automatic start controlling apparatus has a controller. When the engine is automatically started, the controller detects whether the clutch is completely engaged. When the controller detects that the clutch is partially engaged, the controller controls the clutch to gradually and completely engage.

The present invention also provides a detecting apparatus for detecting an engagement state of a clutch. The clutch is included in a transmission coupled to an internal combustion engine. The transmission has an input shaft, which is connected to the engine, and an output shaft. The clutch is located between the input shaft and the output shaft and is engaged to transmit the output torque of the engine from the input shaft to the output shaft. The clutch is actuated by a drive source other than the engine when the engine stops. The detecting apparatus comprises means for determining whether the running state of the engine satisfies a predetermined automatic start condition while the drive source actuates the clutch to engage the clutch, and means for detecting whether the clutch is completely engaged based on the rotation of the input shaft of the transmission when the determining means determines that the condition is satisfied.

The present invention also provides a detecting apparatus for detecting an engagement state of a clutch. The clutch is included in a transmission coupled to an internal combustion engine. The transmission has an input shaft, which is connected to the engine, and an output shaft. The clutch is located between the input shaft and the output shaft and is engaged to transmit the output torque of the engine from the input shaft to the output shaft. The clutch is actuated by a drive source other than the engine when the engine stops. The detecting apparatus comprises means for determining whether the running state of the engine satisfies a predetermined automatic start condition while the drive source actuates the clutch to engage the clutch, and means for detecting whether the clutch is completely engaged based on the rotation speed of the input shaft, the rotation speed of the output shaft and a gear ratio of the transmission when the determining means determines that the condition is satisfied.

The present invention also provides a method for automatically starting an internal combustion engine coupled to a transmission. The transmission has an input shaft connected to the engine, an output shaft, and a clutch located between the input and output shafts. The clutch is engaged to transmit the output torque of the engine from the input shaft to the output shaft. The method comprises actuating the clutch by a drive source other than the engine when the engine stops, detecting whether the clutch is completely engaged when the engine is automatically started, and reducing the output torque of the engine or limiting an increase of the output torque when detecting detects that the clutch is partially engaged.

The present invention also provides a method for automatically starting an internal combustion engine coupled to a transmission. The transmission has an input shaft connected to the engine, an output shaft, and a clutch located between the input and output shafts. The clutch is engaged to transmit the output torque of the engine from the input shaft to the output shaft. The method comprises actuating the clutch by a drive source other than the engine when the engine stops, detecting whether the clutch is completely engaged when the engine is automatically started, and controlling the clutch to gradually and completely engage when the detecting detects that the clutch is partially engaged.

The present invention also provides a detecting method for detecting an engagement state of a clutch, wherein the clutch is included in a transmission coupled to an internal combustion engine. The transmission has an input shaft, which is connected to the engine, and an output shaft. The clutch is located between the input shaft and the output shaft and is engaged to transmit the output torque of the engine from the input shaft to the output shaft. The method comprises actuating the clutch by a drive source that differs from the engine when the engine stops, determining whether the running state of the engine satisfies a predetermined automatic start condition while the drive source actuates the clutch to engage the clutch, and detecting whether the clutch is completely engaged based on the rotation of the input shaft of the transmission when determining that the condition is satisfied.

The present invention also provides a detecting method for detecting an engagement state of a clutch. The clutch is included in a transmission coupled to an internal combustion engine. The transmission has an input shaft, which is connected to the engine, and an output shaft. The clutch is located between the input shaft and the output shaft and is engaged to transmit the output torque of the engine from the input shaft to the output shaft. The method comprises actuating the clutch by a drive source that differs from the engine when the engine stops, determining whether the running state of the engine satisfies a predetermined automatic start condition while the drive source actuates the clutch to engage the clutch, and detecting whether the clutch is completely engaged based on the rotation speed of the input shaft, the rotation speed of the output shaft and a gear ratio of the transmission when determining that the condition is satisfied.

Other aspects and advantages of the invention will become apparent from the following description, taken in conjunction with the accompanying drawings, illustrating by way of example the principles of the invention.

BRIEF DESCRIPTION OF THE SEVERAL VIEWS OF THE DRAWING

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
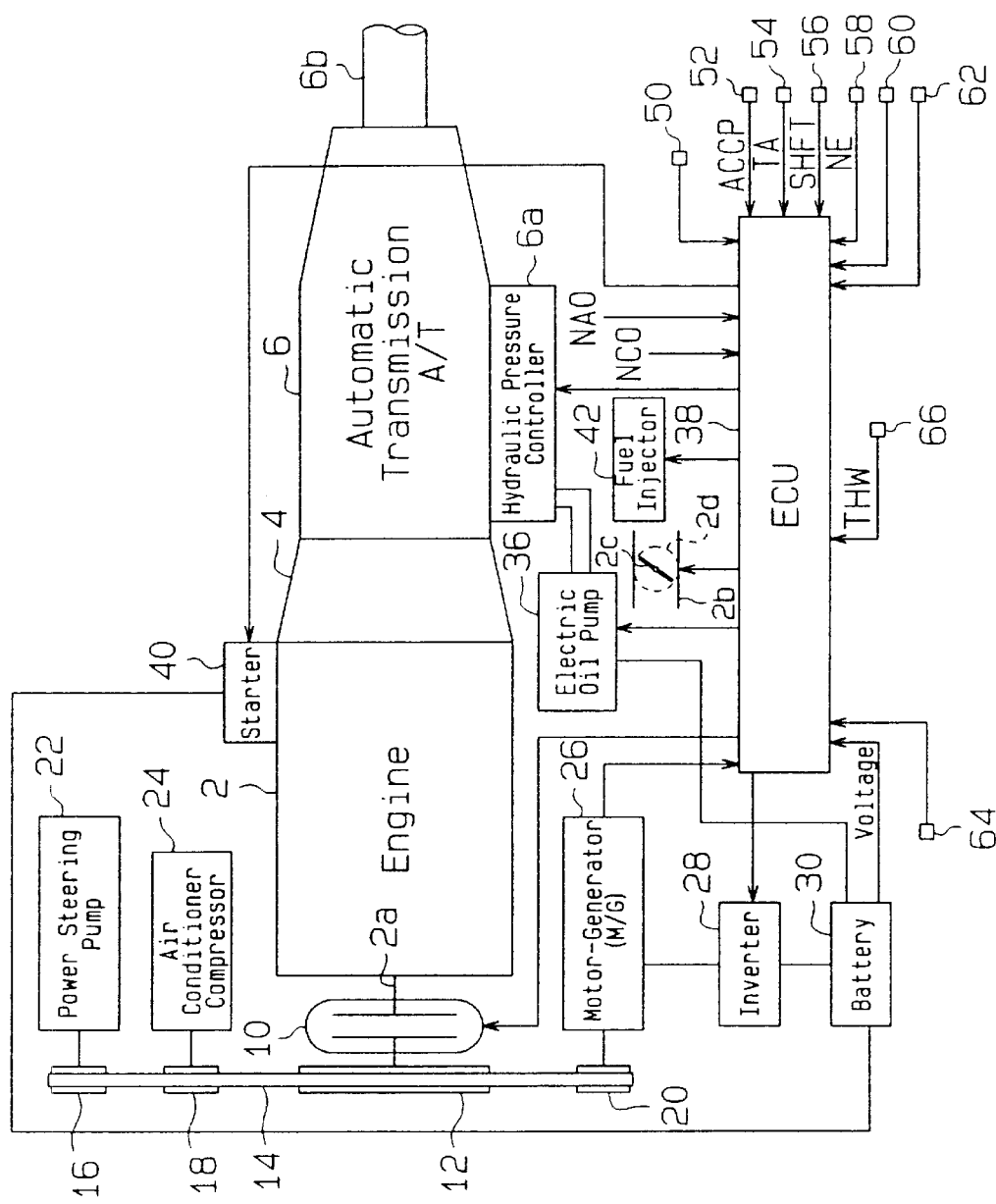
FIG. 1 is a schematic diagram illustrating an engine and a controller according to a first embodiment of the present invention.

An internal combustion gasoline engine 2 and a controller according to a first embodiment of the present invention will now be described with reference to FIGS. 1 to 10. The engine 2 is used for driving a vehicle.

Power of the engine 2 is transmitted to an output shaft 6b through a crankshaft 2a of the engine, a torque converter 4 and an automatic transmission 6. Power is then transmitted to vehicle wheels (not shown). Power of the engine 2 is also transmitted to a belt 14 through an electromagnetic clutch 10, which is coupled to the crankshaft 2a, and a main pulley 12. Power that is transmitted to the belt 14 rotates first, second and third pulleys 16, 18, 20. The electromagnetic clutch 10 selectively transmits power from the crankshaft 2a to the main pulley 12.

A power steering pump 22 is driven by power that is transmitted through the first pulley 16. A compressor 24 in an air conditioner is drive by power that is transmitted through the second pulley 18. A motor-generator 26 is driven by power that is transmitted through the third pulley 20. The motor-generator 26 is electrically connected to an inverter 28. The inverter 28 is switched to selectively charge a battery 30. When the engine 2 is not running and the motor-generator 26 functions as a motor, the inverter 28 adjusts electric energy supplied from the battery 30 to the motor-generator 26 to control the speed of the motor-generator 26.

Figures 2, 3:
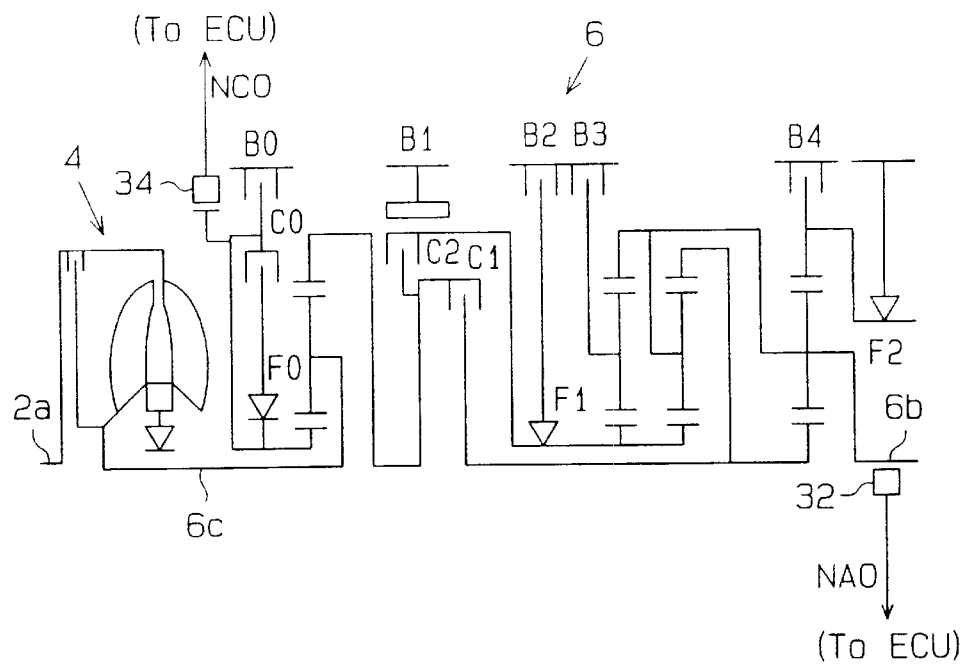
FIG. 2 is a schematic diagram illustrating the structure of the automatic transmission shown in FIG. 1.
FIG. 3 is a chart showing the operation of the automatic transmission shown in FIG. 1.

The automatic transmission 6 includes an oil pump, which is actuated by the engine 2. The oil pump supplies oil to a hydraulic pressure controller 6a. Supplied oil is sent to clutches C0, C1, C2 and brakes B0, B1, B2, B3, B4, which are located in the automatic transmission 6 as shown in FIG. 2, through a control valve in the controller 6a. Accordingly, the operation of the clutches C0 to C2, the brakes B0 to B4 and one-way clutches F0, F1, F2 is controlled. The speed NAO of the output shaft 6b of the automatic transmission 6 is detected by a first speed sensor 32. The turbine speed NCO, or the speed of an input shaft 6c, of the automatic transmission 6 is detected by a second speed sensor 34 through a front sun gear.

An electric oil pump 36 also supplies oil to the hydraulic pressure controller 6a of the automatic transmission 6. Therefore, when the engine 2 is not running, the oil pump 36 actuates the clutches C0 to C2, the brakes B0 to B4 and the one-way clutches F0 to F2. In this embodiment, the automatic transmission 6, the hydraulic controller 6a, and the oil pump 36 form a power transmission mechanism.

An electronic control unit (ECU) 38 is connected to the first and second speed sensors 32, 34. The ECU 38 is also connected to an idle switch 50, an acceleration pedal depression degree sensor 52, a throttle opening degree sensor 54, a shift lever position sensor 56, an engine speed sensor 58, a system switch 60, an air conditioner switch 62, a brake switch 64 and a coolant temperature sensor 66.

When an acceleration pedal is depressed, the idle switch 50 is turned off. When the acceleration pedal is not depressed, the idle switch 50 is turned on. A signal indicating the on-off state of the idle switch 50 is sent to the ECU 38. The acceleration pedal depression degree sensor 52 detects the acceleration pedal depression degree ACCP. The detected signal is sent to the ECU 38.

The throttle sensor 54 detects the opening degree of a throttle valve 2c. The detected signal is sent to the ECU 38. The throttle valve 2c is located in an intake passage 2b of the engine 2 to adjust the flow rate of air that is drawn into the engine 2. The shift position sensor 56 detects the shift position SHFT of the automatic transmission 6. The detected signal is sent to the ECU 38. The engine speed sensor 58 detects the speed NE of the engine 2. The detected signal is sent to the ECU 38.

As a driver turns the system switch 60 on and off, the economy running system is started and stopped. On-off signals of the system switch 60 are sent to the ECU 38. As the driver turns the air conditioner switch 62 on and off, the air conditioner is started and stopped. On-off signals of the air conditioner switch 62 are sent to the ECU 38. When the brake pedal is depressed, the brake switch 64 is turned on. When the brake pedal is not depressed, the brake switch 64 is turned off. On-off signals of the brake switch 64 are sent to the ECU 38. The coolant temperature sensor 66 detects the coolant temperature THW of the engine 2. The detected signal is sent to the ECU 38.

The main part of the ECU 38 includes a microcomputer. The microcomputer includes a read only memory (ROM) and a random access memory (RAM). The ECU 38 executes various computations in accordance with the programs stored in the ROM. Based on the results of the computation, the ECU 38 actuates a throttle valve motor 2d, the hydraulic controller 6a, the electromagnetic clutch 10, the inverter 28, the electric oil pump 36, the starter 40, a fuel injector 42 and an igniter (not shown). Accordingly, the engine 2 and the automatic transmission 6 are controlled. The throttle valve motor 2d adjusts the opening degree TA of the throttle valve 2c. The fuel injector 42 injects fuel into the intake port (not shown) of the engine 2. Alternatively, the engine 2 may have multiple fuel injectors 42, each of which inject fuel into the associated combustion chamber (not shown).

An automatic stop procedure, automatic start procedure, shock reduction procedure and throttle opening degree changing procedure, which are executed by the ECU 38, will now be described. The automatic stop procedure and the automatic start procedure are executed when the system switch 60 is turned on by the driver.

Figure 4:
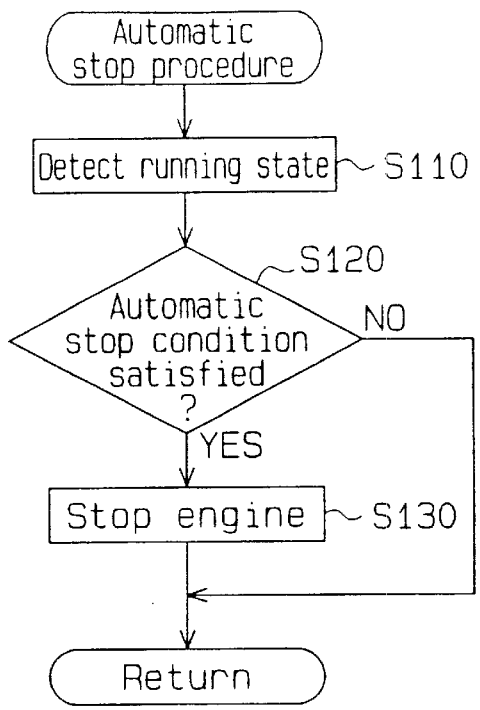
FIG. 4 is a flowchart showing an automatic stop procedure executed by the ECU shown in FIG. 1.

FIG. 4 shows a flowchart of the automatic stop procedure. This procedure is executed at predetermined intervals. In step S110, running state of the engine 2 is detected. For example, the coolant temperature THW, which is detected by the coolant temperature sensor 66, the depression state of the acceleration pedal, which is detected by the idle switch 50, the voltage of the battery 30, the depression state of the brake pedal, which is detected by the brake switch 64 and the vehicle speed SPD, which is computed based on the detection value of the first speed sensor 32, are stored in the RAM of the ECU 38.

In step S120, the ECU 38 judges whether the following conditions (1) to (5) are satisfied. Condition (1) refers to a state of the engine 2 in which the engine 2 is warm and is not overheated (the coolant temperature THW is lower than an upper limit value THWmax and higher than a lower limit value THWmin). Condition (2) refers to a state in which the acceleration pedal is not depressed (the idle switch 50 is on). Condition (3) refers to a state in which the charge level of the battery 30 is equal to or greater than a predetermined level (the voltage of the battery 30 is equal to or greater than a referential level). Condition (4) refers to a state in which the brake pedal is depressed (the brake switch 64 is on). The condition (5) refers to a state in which the vehicle is not moving (the vehicle speed SPD is 0 km/h). When conditions (1) to (5) are satisfied, the ECU 38 judges that the automatic stop condition is satisfied.

If the outcome of step S120 is negative, or when one or more of the conditions (1) to (5) are not satisfied, the ECU 38 judges that the automatic stop condition is not satisfied and terminates the procedure.

When the conditions (1) to (5) are satisfied, the outcome of step S120 is positive and the ECU 38 proceeds to step S130. In step S130, the ECU 38 stops the engine 2. For example, fuel injection from the fuel injector 42 and the ignition of air-fuel mixture in the combustion chamber by the ignition plug are stopped, which immediately stops the engine 2. The ECU 38 then terminates the procedure. In step S130, the electric oil pump 36 is started.

Figure 5:
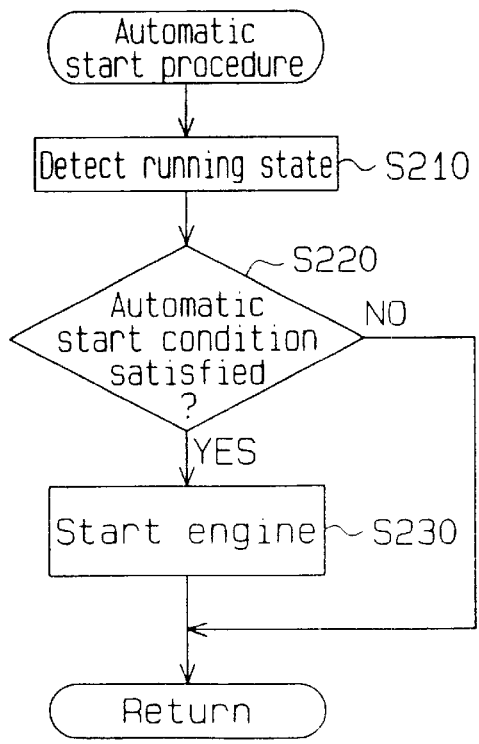
FIG. 5 is a flowchart showing an automatic start procedure executed by the ECU shown in FIG. 1.

FIG. 5 shows a flowchart of the automatic start procedure. This procedure is executed at predetermined intervals. In step S210, the running state of the engine 2 is detected for determining whether the procedure needs to be started. The data is stored in the RAM of the ECU 38.

In this embodiment, for example, the data that is stored in the RAM in step S110 of FIG. 4, or the coolant temperature THW, the acceleration pedal depression degree ACCP, the voltage of the battery 30, the on-off state of the brake witch 64 and the vehicle speed SPD, are stored in the RAM.

If at least one of the conditions (1) to (5) is not satisfied in step S220, the ECU 38 judges that the automatic start condition is satisfied.

In addition to the conditions (1) to (5), other conditions may be considered. Alternatively, one or more conditions may be deleted from the conditions (1) to (5).

If the outcome of step S220 is negative, that is, if the engine 2 was not stopped by the automatic stop procedure, the automatic start condition is not satisfied and the ECU 38 terminates the procedure. Also, if all the conditions (1) to (5) are satisfied, the automatic start condition is not satisfied and the ECU 38 terminates the procedure.

If one or more of the conditions (1) to (5) are not satisfied after the engine 2 is stopped by the automatic stop procedure, that is, when the outcome of step S220 is positive, the ECU 38 proceeds to step S230. In step S230, the ECU 38 starts the automatic start procedure and, thereafter, temporarily suspends the procedure.

In step S230, the starter 40 is actuated to rotate the crankshaft of the engine 2. Further, a fuel injection procedure for starting the engine 2 and an ignition timing control procedure for starting the engine 2 are performed so that the engine 2 is automatically started. When the engine 2 is started, a normal fuel injection control procedure and a normal ignition timing control procedure and other procedures for running the engine 2 are started. When the hydraulic pressure generated by the oil pump in the automatic transmission 6 increases to a sufficient level by the operation of the engine 2, the electric oil pump 36 is stopped.

Figure 6:
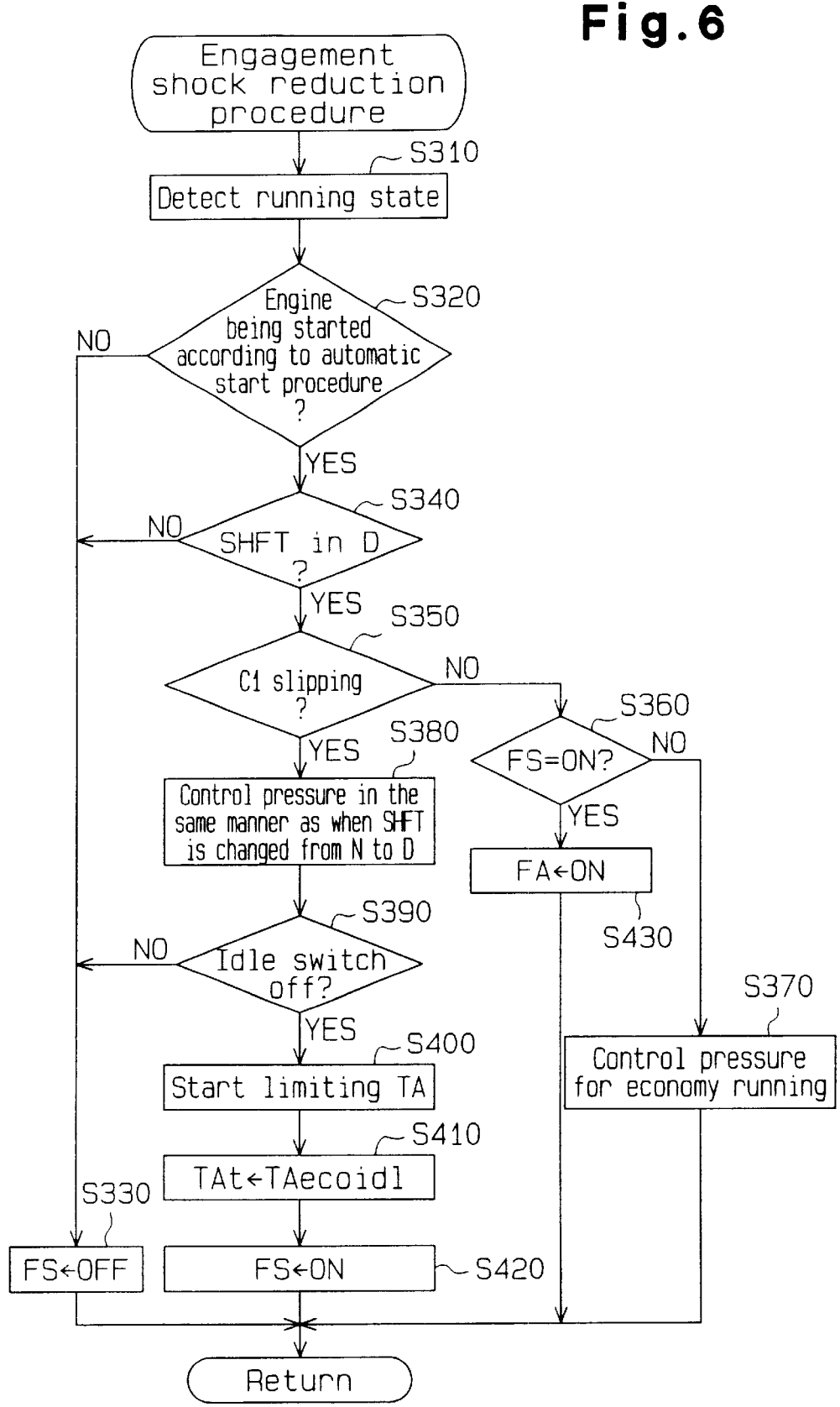
FIG. 6 is a flowchart showing a procedure for reducing shock caused by engagement of a clutch in the procedure of FIG. 5.

When the engine 2 is automatically started in step S230, the shock of engagement of the clutch C1 is reduced by a procedure shown in FIG. 6. The procedure of FIG. 6 is performed at predetermined short intervals. In step S310, the speed NAO of the output shaft 6b of the automatic transmission 6, the turbine speed NCO, the shift position SHFT of the automatic transmission 6, the on-off state of the idle switch, the throttle opening degree TA, the acceleration pedal depression degree ACCP, the engine speed NE and the vehicle speed SPD are stored in the working area of the RAM in the ECU 38.

In step S320, the ECU 38 judges whether the engine 2 is being started according to step S230. If the engine 2 is not being started by the automatic start procedure, or if the outcome of step S320 is negative, the ECU 38 proceeds to step S330. In step S330, the ECU 38 sets an output limiting flag FS to OFF and temporarily suspends the current routine. If the engine 2 is being started by the automatic start procedure, or if the outcome of step S320 is positive, the ECU 38 proceeds to step S340. In step S340, the ECU 38 judges whether the shift position SHFT is D, which is shown in FIG. 3. If the shift position SHFT is not D, or if the outcome of step S340 is negative, the ECU 38 proceeds to step S330. In step S330, the ECU 38 sets the output restriction flag FS to OFF and temporarily suspends the current routine.

If the current shift position SHFT is D, the outcome of step S340 is positive. That is, the ECU 38 judges that engine 2 was automatically started while power of the engine 2 was transmitted from the input shaft 6c to the output shaft 6b of the automatic transmission 6. Thereafter, the ECU 38 proceeds to step S350. In step S350, the ECU 38 judges whether the clutch C1 of the automatic transmission 6 is slipping based on the turbine speed NCO, which is detected by the second speed sensor 34, the output shaft speed NAO, which is detected by the first speed sensor 32, and a gear ratio Gr, which corresponds to the shift position of the automatic transmission 6. If the clutch C1 is not slipping, the following equation (1) is satisfied.

$$NCO = NAO \times Gr \quad (1)$$

If the clutch C1 is slipping, the equation (2) is satisfied.

$$NCO > NAO \times Gr \quad (2)$$

Immediately after the automatic start procedure is initiated, the crankshaft of the engine is about to be rotated by the starter 40. At this time, the turbine speed NCO, the output shaft speed NAO are both 0 rpm regardless of the engage state of the clutch C1. In this state, the equation (1) is satisfied. Accordingly, the outcome of step S350 is negative, and the ECU 38 proceeds to step S360. In step S360, the ECU 38 judges whether the output limiting flag FS is ON. Since the ECU 38 set the flag FS to OFF in step S330, the outcome of step S360 is negative. Then, the ECU 38 proceeds to step S370. In step S370, the ECU 38 starts controlling the hydraulic pressure in the automatic transmission 6 in a manner for economy running. Thereafter, the ECU 38 temporarily terminates the procedure.

During the automatic start procedure, the hydraulic pressure controller 6a maximizes the hydraulic pressure applied to the clutch C1 when the clutch C1 engages to quickly increase the torque capacity of the clutch C1. Therefore, if the electric oil pump 36 applies sufficient hydraulic pressure to the clutch C1 during the automatic stop procedure, the engagement of the clutch C1 is maintained continuously after the procedure.

If the engine 2 is started while the electric pump 36 is applying sufficient hydraulic pressure to the automatic transmission 6 and the clutch C1 is not slipping in the automatic start procedure, that is, if the outcome of step S320 is negative, the ECU 38 sets the output limiting flag FS to OFF in step S330. Then, the ECU 38 temporarily suspends the current routine. After the engine 2 is started, the hydraulic pressure in the automatic transmission 6 is controlled by the oil pump in the automatic transmission 6. Therefore, the ECU 38 stops the electric oil pump 36 when the hydraulic pressure of the oil pump in the automatic transmission 6 is sufficient.

If the clutch C1 slips during the automatic start procedure due to insufficient hydraulic pressure applied to the automatic transmission 6 by the electric oil pump 36, that is, if the outcome of step S350 is positive, the ECU 38 proceeds to step S380. In step S380, the hydraulic pressure in the automatic transmission 6 is controlled in the same manner as when the shift position SHFT is changed from the N to the D in a normal driving mode. In step S380, the clutch C1 is gradually engaged to reduce the shock of engagement. Therefore, after the hydraulic pressure to the clutch C1 is maximized in step S370, the ECU 38 duty controls the electromagnetic valve in the hydraulic controller 6a to temporarily lower the hydraulic pressure and then gradually increases the hydraulic pressure applied to the clutch C1. Thus, when the hydraulic pressure generated by the oil pump of the automatic transmission 6 is increased, the clutch C1 is not abruptly engaged. Accordingly, the shock caused by engagement of the clutch C1 is reduced.

Once executed, step S380 is not repeated in the same cycle. That is, step S380 is performed only when steps S320, S340, S350 are satisfied after the automatic start control is started each time. Step S380 will be performed when steps S320, S340, S350 are satisfied in the subsequent automatic start control.

In step S390, the ECU 38 judges whether the idle switch 50 is off. If the idle switch 50 is on, the outcome of step S390 is negative and the ECU 38 proceeds to step S330. In step S330, the ECU 38 sets the output limiting flag FS to OFF and temporarily suspends the current routine. Thereafter, if the idle switch 50 remains on, the hydraulic pressure applied to the clutch C1 by the automatic transmission 6 is sufficient, and the clutch C1 does not slip, the outcome of step S350 will be negative. In this case, the ECU 38 proceeds to step S360. In step S360, since the flag FS is set at OFF, the outcome is negative and the ECU 38 proceeds to step S370. In step S370, the ECU 38 controls the hydraulic pressure supplied to the automatic transmission 6 and temporarily suspends the current routine.

If the driver steps on the acceleration pedal while the clutch C1 is slipping, the idle switch 50 is turned off. In this case, the outcome of step S390 is positive. Also, if the idle switch 50 is off when the automatic start control is started, the outcome of the ECU 38 is positive. In these cases, the ECU 38 proceeds to step S400. In step S400, the ECU 38 starts limiting the throttle opening degree TA. That is, the ECU 38 starts a procedure for delaying the increase of the throttle opening degree TA.

Figure 7:
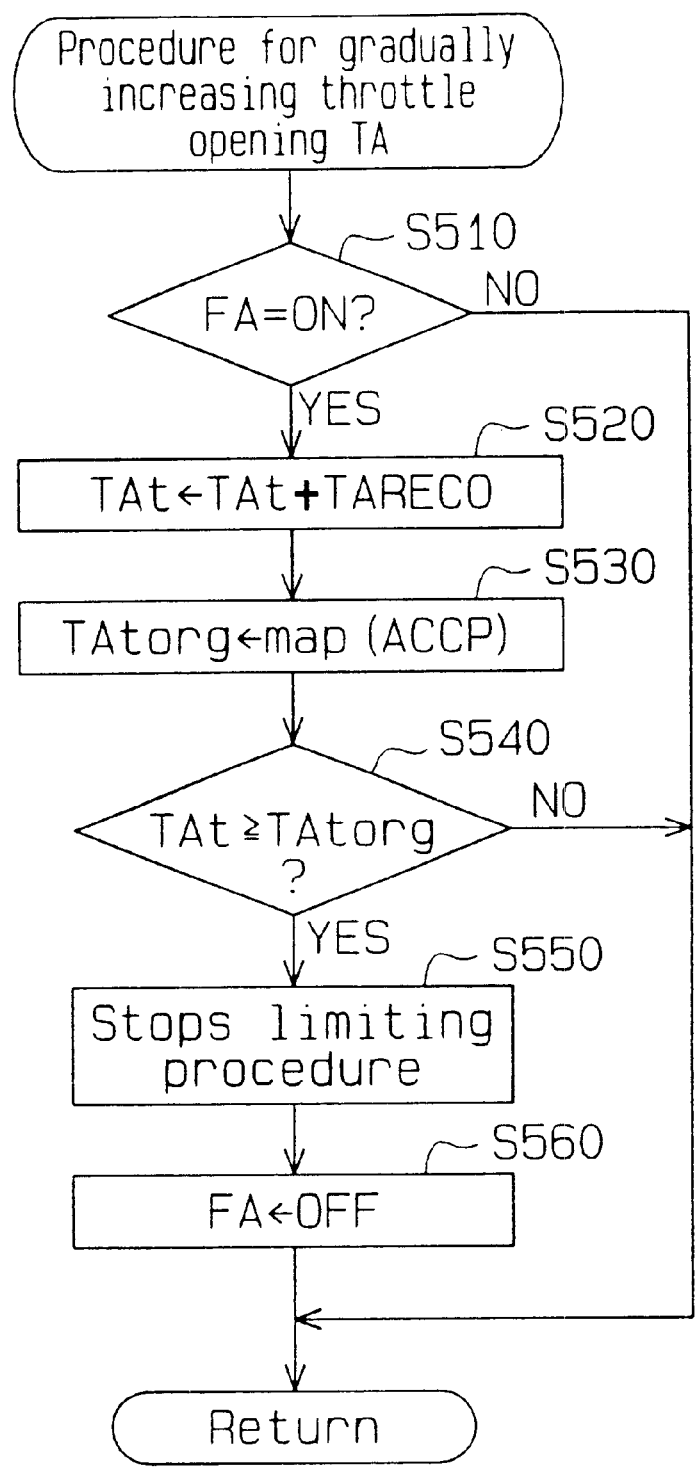
FIG. 7 is a flowchart showing a procedure for changing the throttle opening degree TA.

The throttle opening TA is limited based on a target value TAt of the throttle opening degree TA, which is computed in the flowchart of FIGS. 6 and 7.

In step S400, the ECU 38 starts controlling the throttle opening degree TA. Then, the ECU 38 proceeds to step S410. In step S410, the target value TAt of the throttle opening degree TA, which is used for controlling the opening degree of the throttle valve 2c, is set to an idle throttle opening degree TAecoidl. In this embodiment, the idle throttle opening degree TAecoidl is zero percent (TAecoidl=0%). As long as the engagement shock of the clutch C1 is reduced when the hydraulic pressure from the oil pump in the automatic transmission 6 is increased to completely engage the clutch C1, the idle throttle opening degree TAecoidl may be greater than zero percent.

In step S420, the ECU 38 sets the output limiting flag FS to ON and temporarily suspends the current routine.

In step S410, the ECU 38 maintains the throttle opening degree TA at zero percent until the clutch C1 does not slip even if the driver steps on the acceleration pedal. Thereafter, when the hydraulic pressure of the oil pump in the automatic transmission 6 is sufficient and therefore the clutch C1 does not slip, the outcome of step S350 is negative. In this case, the ECU 38 proceeds to step S360. Since the flag FS is ON, the outcome of step S360 is positive. In step S430, the ECU 38 sets a flag FA to ON, which starts changing the throttle opening degree TA. Then, the ECU 38 temporarily suspends the current routine.

A control procedure for changing the throttle opening degree TA will now be described with reference to FIG. 7. The routine of FIG. 7 is executed every predetermined intervals. In step S510, the ECU 38 judges whether the flag FA is ON. If step S430 of FIG. 6 has not been executed and the flag FA is OFF, the outcome of step S510 is negative. In this case, the ECU 38 temporarily suspends the current routine.

If the flag FA is set to ON in step S430, the outcome is positive and the ECU 38 proceeds to step S520. In step S520, a target value TAt of the throttle opening degree TA is computed by referring to the following equation (3).

$$TAt = TAt + TARECO \qquad (3)$$

The ECU 38 adds the value TARECO to the current target throttle opening degree TAt to obtain a new target degree TAt. The value TARECO represents an amount of opening degree that is required in each routine for changing the target throttle opening degree TAt to a value that corresponds to a normal running state of the engine 2.

In step S530, a throttle opening TAtorg, which is used in a normal control procedure, is obtained from a map that is computed based on the acceleration pedal depression degree ACCP. In addition to the acceleration pedal depression degree, the map may have other parameters that represent the running state of the engine 2.

In step S540, the ECU 38 judges whether the target value TAt of the throttle pedal opening degree TA is equal to greater than the throttle opening degree TAtorg. If the throttle opening degree TAt is less than the throttle opening TAtorg (TAt<TAtorg), the outcome of step S540 is negative. In this case, the ECU 38 temporarily suspends the current routine.

If the throttle opening TAt is equal to or greater than the throttle opening TAtorg (TAt≧TAtorg), the outcome of step S540 is positive, and the ECU 38 proceeds to step S550. In step S550, the ECU 38 stops the procedure for limiting the throttle opening degree TA. That is, the ECU 38 starts controlling the opening degree of the throttle valve 2c referring to the map, which is based on the acceleration pedal depression degree ACCP.

In step S560, the ECU 38 sets the flag FA to OFF and terminates the routine.

Figure 8:
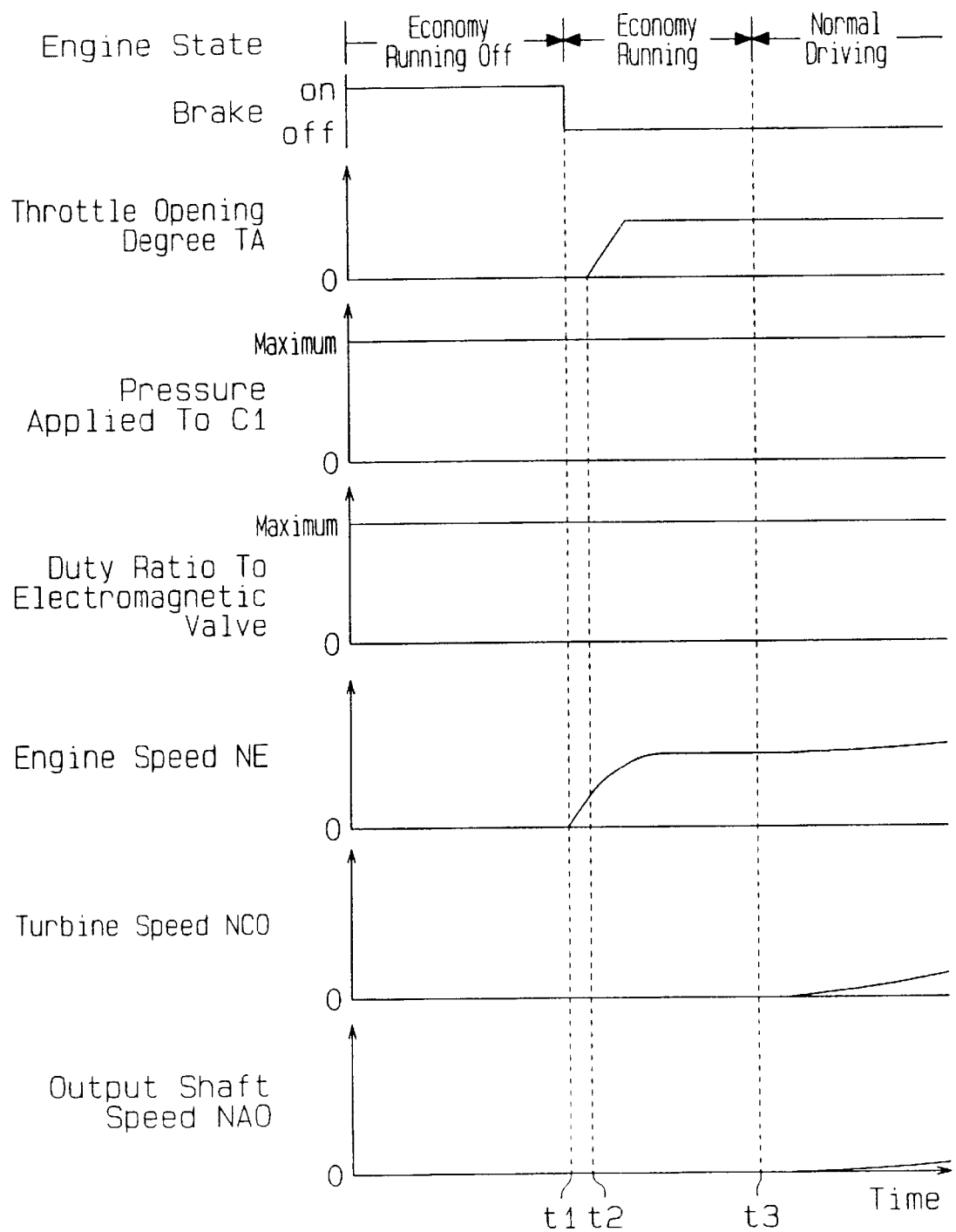
FIG. 8 is a timing chart showing an operation when the electric oil pump of FIG. 1 is generating sufficient hydraulic pressure.

One example of the above described procedure will now be described with reference to timing charts of FIGS. 8 to 10. FIG. 8 shows a case when the hydraulic pressure generated by the electric pump 36 is normal during the automatic stop procedure of the engine 2. The brake switch is turned off at time t1. At this time, the turbine speed NCO and the output shaft speed NAO are 0 rpm. In this case, the ECU 38 judges that the clutch C1 is not slipping. That is, the outcome of step S350 is negative. Therefore, the throttle opening TA and the duty ratio for the electromagnetic valve are controlled according to the normal economy running control of step S370.

Figure 9:
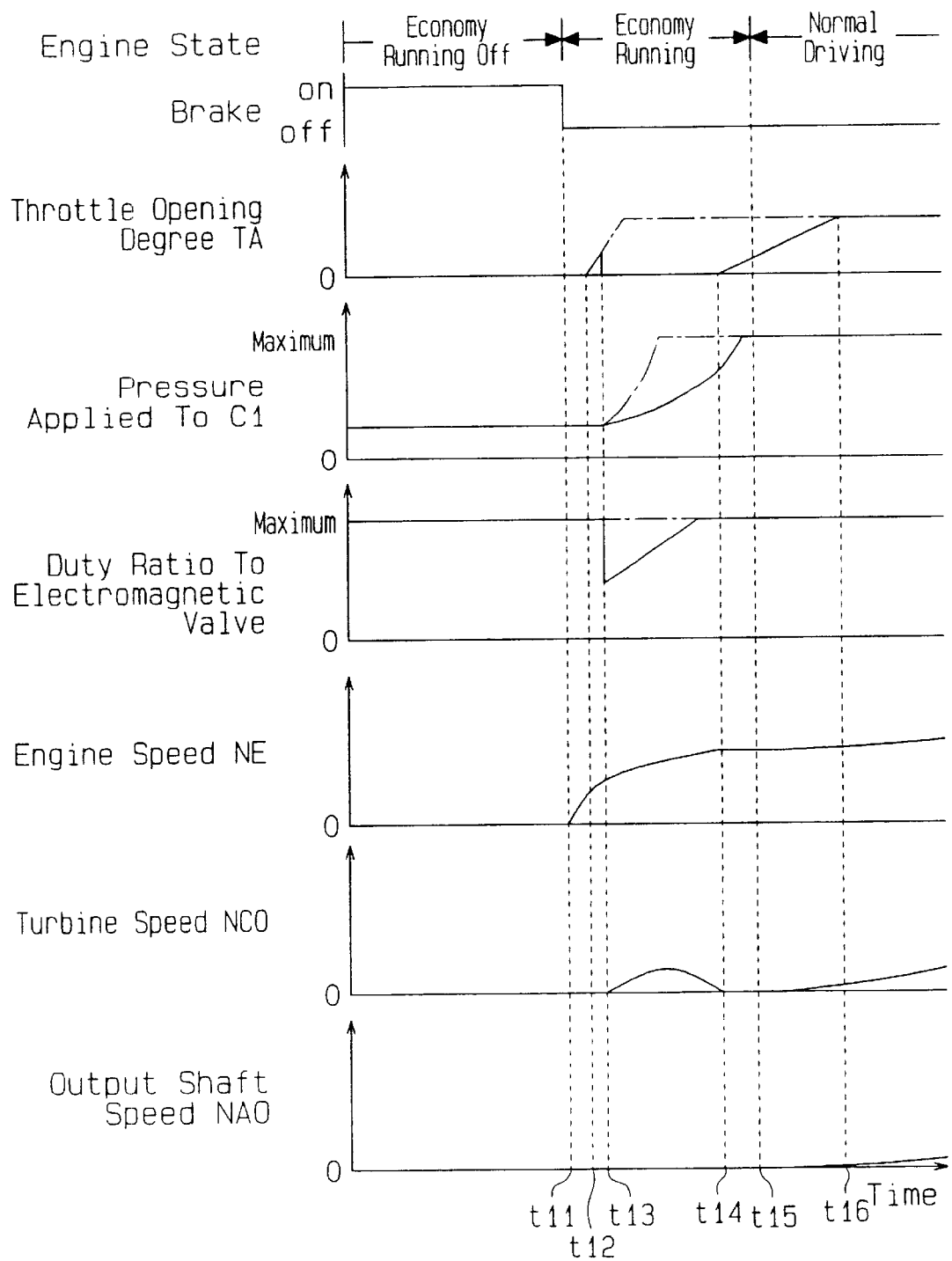
FIG. 9 is a timing chart showing an operation when the electric oil pump of FIG. 1 is generating insufficient hydraulic pressure.

FIG. 9 shows a case where the hydraulic pressure generated by the electric oil pump 36 is insufficient during the automatic stop procedure of the engine 2. During the period from time t13 to t14, the turbine speed NCO changes despite that the output shaft speed NAO is 0 rpm. Thus, the ECU 38 judges that the clutch C1 is slipping. In this case, in step S380 of FIG. 6, the ECU 38 changes the hydraulic pressure applied to the automatic transmission 6 in the same manner as when the shift position SHFT is switched from the N to the D. In this procedure, the duty ratio to the electromagnetic valve is decreased at time t13 and is then gradually increased. The throttle valve opening degree TA starts increasing from time t12 due to depression of the acceleration pedal. At time t13, the throttle opening degree TA is set to the idle throttle opening degree TAecoidl (TAecoidl=0%). In this manner, the hydraulic pressure applied to the clutch C1 is gradually increased.

At time t14, the clutch C1 stops slipping. Then, the throttle opening degree TA is increased according to the routine of FIG. 7 until the throttle opening degree TA reaches a value of the normal control procedure at time t16. If the duty ratio of the electromagnetic valve is not controlled in step S380 or if the throttle valve opening degree TA is not controlled in step S410, the hydraulic pressure applied to the clutch C1 is suddenly increased as shown by broken line.

Figure 10:
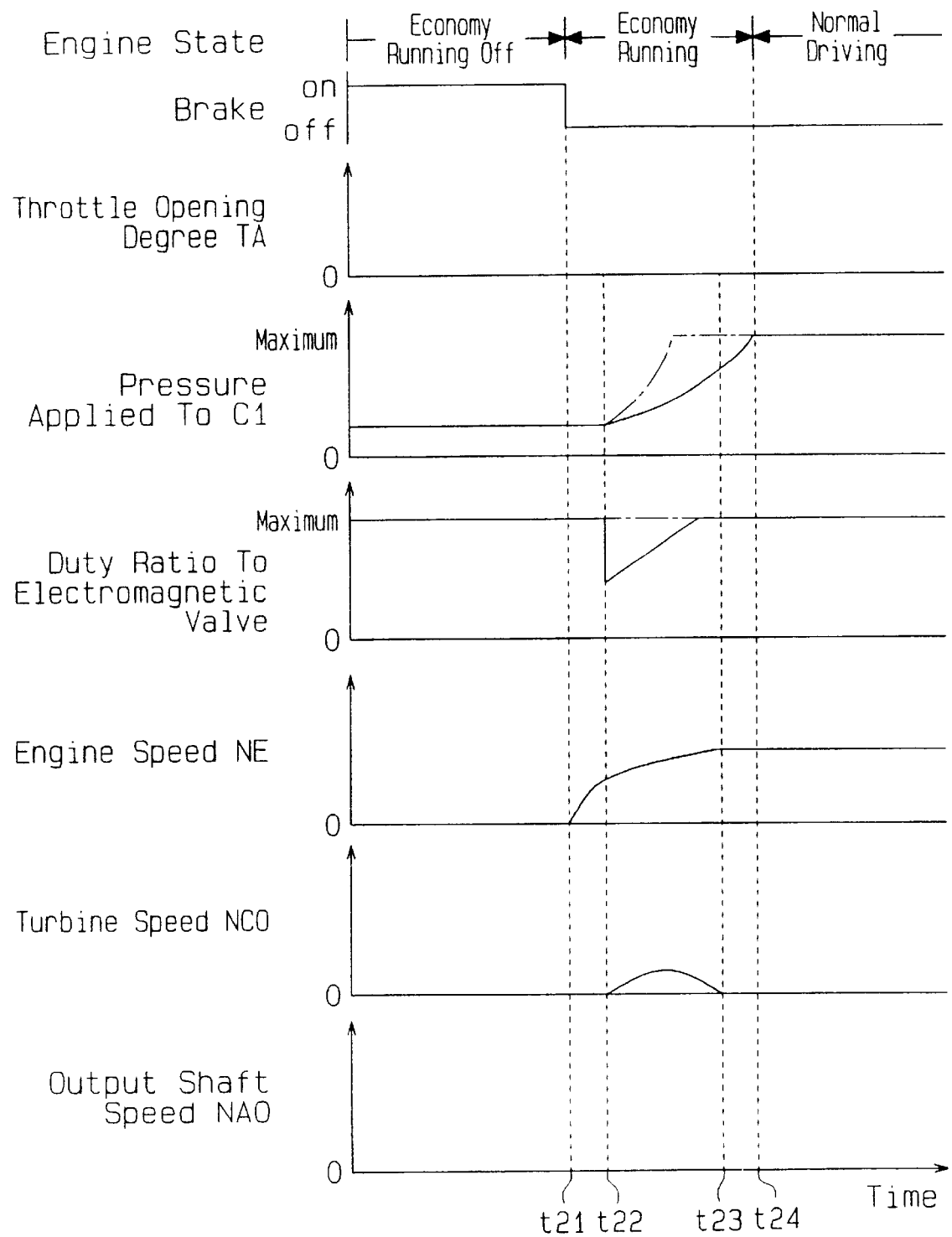
FIG. 10 is a timing chart like FIG. 9.

FIG. 10 shows a case that is slightly different from the case of FIG. 9. Specifically, the driver releases the brake pedal but does not press the acceleration pedal in the case of FIG. 10. If the clutch C1 is detected to be slipping in this case, the duty ratio of the electromagnetic valve is decreased at time t22. Then, the duty ratio is gradually increased. Accordingly, the hydraulic pressure applied to the clutch C1 is gradually increased.

The above embodiment has the following advantages.

If the hydraulic pressure generated by the hydraulic pressure controller 6a is insufficient due to, for example, a malfunction in the electric oil pump 36, a relatively high hydraulic pressure generated by the oil pump of the automatic transmission 6 creates an excessive shock when the clutch C1 is engaged after the engine 2 is automatically started.

However, in this embodiment, the throttle opening degree TA is set to 0% to minimize the output torque of the engine. Therefore, the output torque of the engine 2 is not suddenly transmitted to the automatic transmission 6 and the devices that are coupled to the automatic transmission 6. Accordingly, the shock due to engagement of the clutch C1 is reduced.

When the clutch C1 stops slipping, the throttle opening degree TA is gradually increased to a value of the normal control procedure. Accordingly, the output torque of the engine 2 is gradually increased. Therefore, the shock when the output torque is restored is reduced.

Further, when engagement of the clutch C1 is expected to generate a shock, the hydraulic pressure applied to the clutch C1 is gradually changed from the engagement state from the non-engagement state or from the half engagement state. Therefore, the output torque of the engine 2 is not suddenly transmitted to the automatic transmission 6 of the devices that are coupled to the automatic transmission 6. Thus, the shock generated when the clutch C1 is engaged is further reduced.

As in the equations (1) and (2), whether the clutch C1 is slipping is easily detected based on the turbine speed NCO, the speed NAO of the output shaft 6b and the gear ratio Gr.

A second embodiment of the present invention will now be described with reference to FIG. 11. The embodiment of FIG. 11 does not include an electric oil pump. While the automatic stop procedure of an engine 102 is being executed, an accumulator 136 applies hydraulic pressure to a hydraulic pressure controller 106a. Only the differences from the embodiment of FIGS. 1 to 10 will be discussed.

When the engine 102 is running, an oil pump 106d of an automatic transmission 106 applies hydraulic pressure to the hydraulic pressure controller 106a through a check valve 136a. Therefore, when the engine 102 is running, hydraulic pressure is accumulated in the accumulator 136. When the engine 102 is automatically stopped, the pressure in the oil pump 106 is lowered. However, the check valve 136a maintains the pressure in the accumulator 136. Thus, when the engine 102 is automatically stopped, the engagement of the clutch C1 is reliably maintained.

If the hydraulic pressure applied to the hydraulic pressure controller 106a by the accumulator 136 is insufficient, the clutch C1 slips when the engine 102 is automatically started. At this time, based on the procedures shown in FIGS. 6 and 7, the shock generated by engagement of the clutch C1 is reliably prevented.

Figure 11:
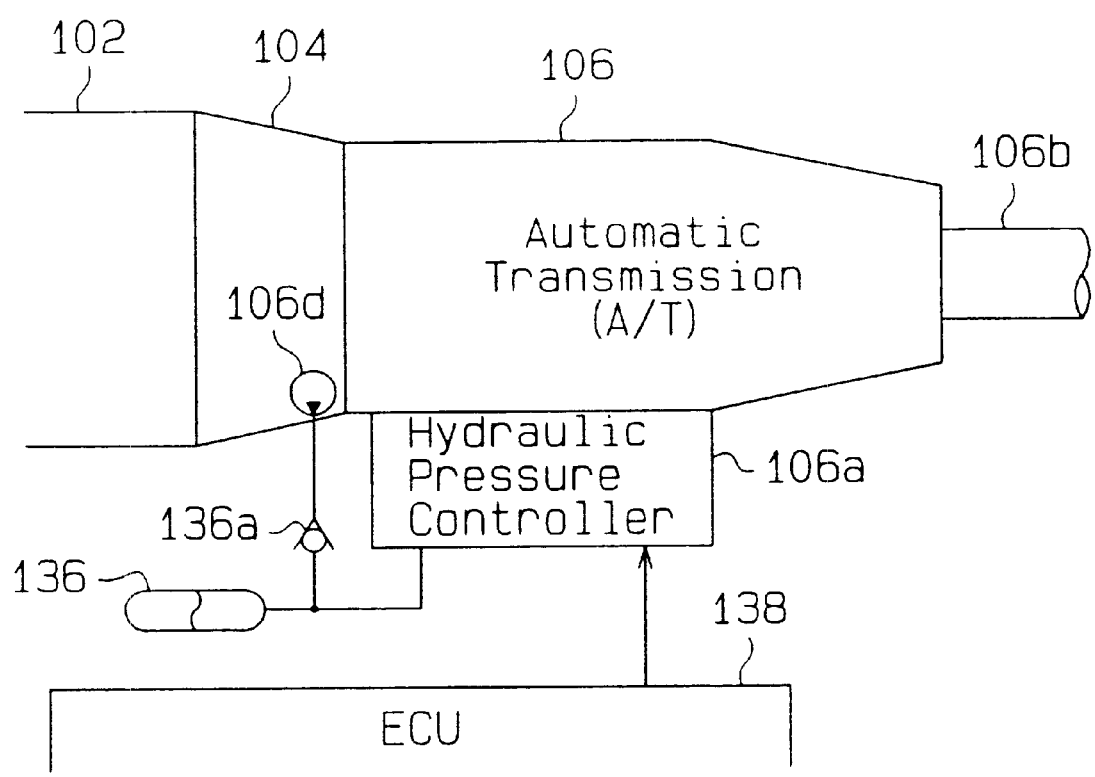
FIG. 11 is a schematic diagram illustrating a controller according to a second embodiment.

In addition to the advantages of the embodiment of FIGS. 1 to 10, the embodiment of FIG. 11 has the following advantages.

Since the system of FIG. 11 does not include an electric oil pump, the structure is simplified, which reduces the cost and saves the power of the battery 27. As a result, the fuel economy is improved. judges that the clutch C1 is not slipping and temporarily suspends the current routine.

If the outcome of step S640 is positive, that is, if the shift position SHFT is D, the ECU 38 proceeds to step S650. In step S650, the ECU 38 judges whether the engine speed NE exceeds a reference speed NE0. The reference speed NE0 is for example 400 rpm to 500 rpm. If the outcome of step S650 is negative, that is if the engine speed NE is equal to or less 10 than the reference speed NE0 (NE≧NE0), the ECU 38 judges that the clutch C1 is not slipping and temporarily suspends the current routine.

If the outcome of step S650 is positive, that is, if the engine speed NE is greater than the reference speed NE0 (NE>NE0), the ECU 38 judges that the engine speed NE reached the reference speed NE0 while the output torque of the engine 2 was being transmitted from the input shaft 6c to the output shaft 6b of the automatic transmission 6 after the engine 2 had been automatically started. In step S660, the ECU 38 judges whether there is still time until a predetermined period T0 elapses from when the engine 2 was automatically started. The period T0 is, for example, 0.5 to 1 seconds. If the outcome of step S660 is negative, that is, if the reference period T0 has elapsed from when the engine 2 was automatically started, the ECU 38 judges that the clutch C1 is not slipping and temporarily suspends the current routine.

Figure 12:
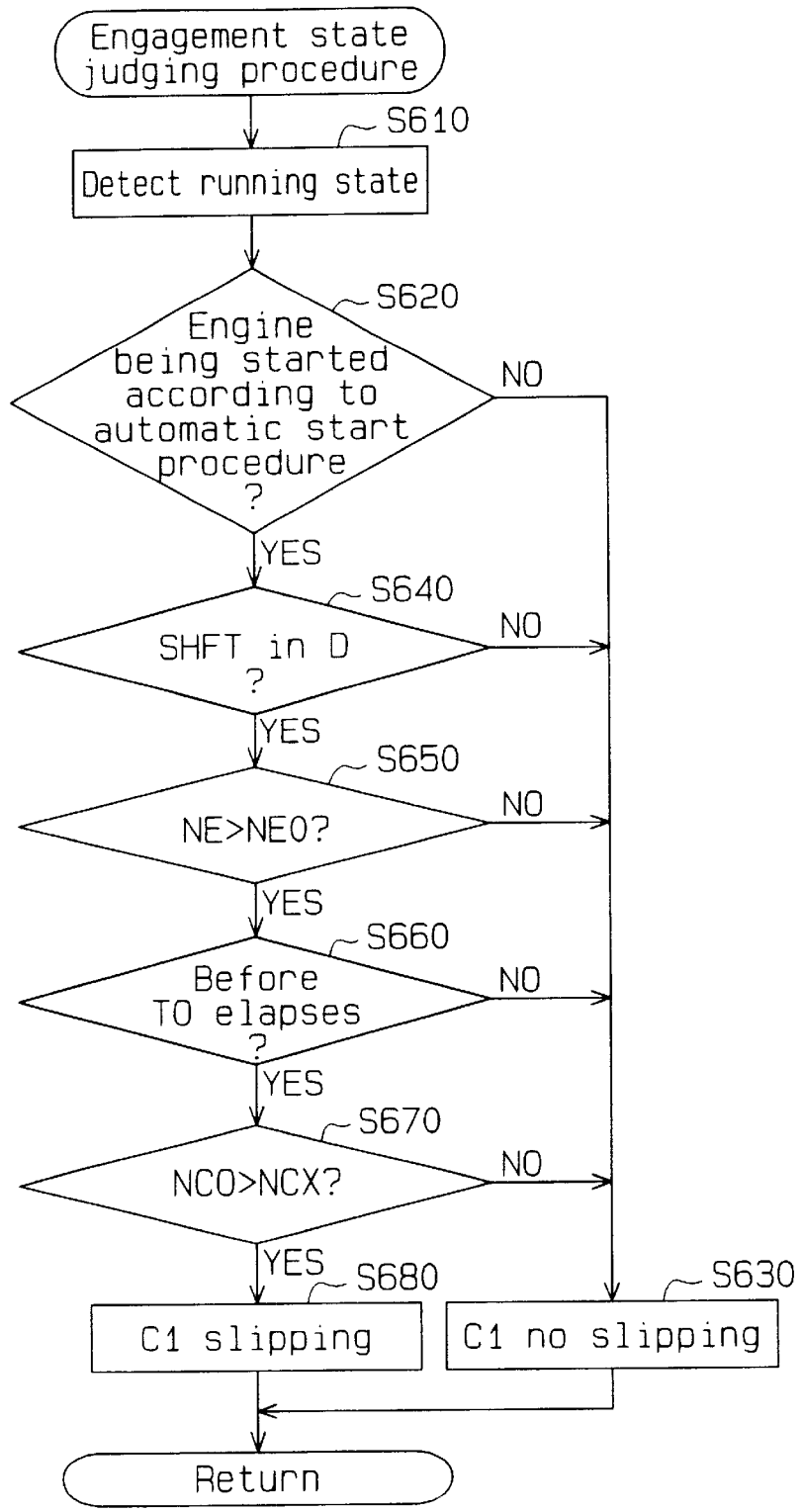
FIG. 12 is a flowchart showing a procedure executed by an ECU for determining the power transmitting state of the clutch according to a third embodiment.

If the outcome of step S660 is positive, that is, if there is still time until the reference period T0 elapses, the ECU 38 proceeds to step S670. In step S670, the ECU 38 judges whether the turbine speed NCO, which is detected by the second speed sensor 34, is greater than a reference speed NCX. At this time, the engine 2 is running after being automatically started and the vehicle is in a non-moving state or substantially in a non-moving state, and the wheels are almost not rotating. If the clutch C1 is not slipping, the turbine speed NCO is zero or substantially zero. In the embodiment of FIG. 12, the reference speed NCX represents zero or substantially zero of the turbine speed NCO.

If the outcome of step S670 is negative, that is if the turbine speed NCO is equal to or less than the reference speed NCX (NCO≦NCX), the ECU 38 judges that the clutch C1 is not slipping and temporarily suspends the current routine. If the outcome of step S670 is positive, that is, if the turbine speed NCO is greater than the reference speed NCX (NCO>NCX), the ECU 38 proceeds to step S680. In step S680, the ECU 38 judges that the turbine is not completely held by the wheels and rotating due to slipping of the clutch C1. That is, the ECU 38 judges that the clutch C1 is slipping and temporarily suspends the current routine.

In this manner, the ECU 38 judges whether the clutch C1 is slipping. The result of the procedure shown in FIG. 12 is referred to in step S350 of FIG. 6.

In addition to the advantages of the embodiment shown in FIGS. 1 to 10, the embodiment of FIG. 12 has the following advantages.

Whether the clutch C1 is slipping is easily detected by comparing the turbine speed NCO with the reference speed NCX. Also, the second speed sensor 34, which is used for controlling the automatic transmission 6, is used for detecting whether the clutch C1 is slipping. Therefore, whether the clutch C1 is slipping is detected without using any additional sensor.

Figure 13:
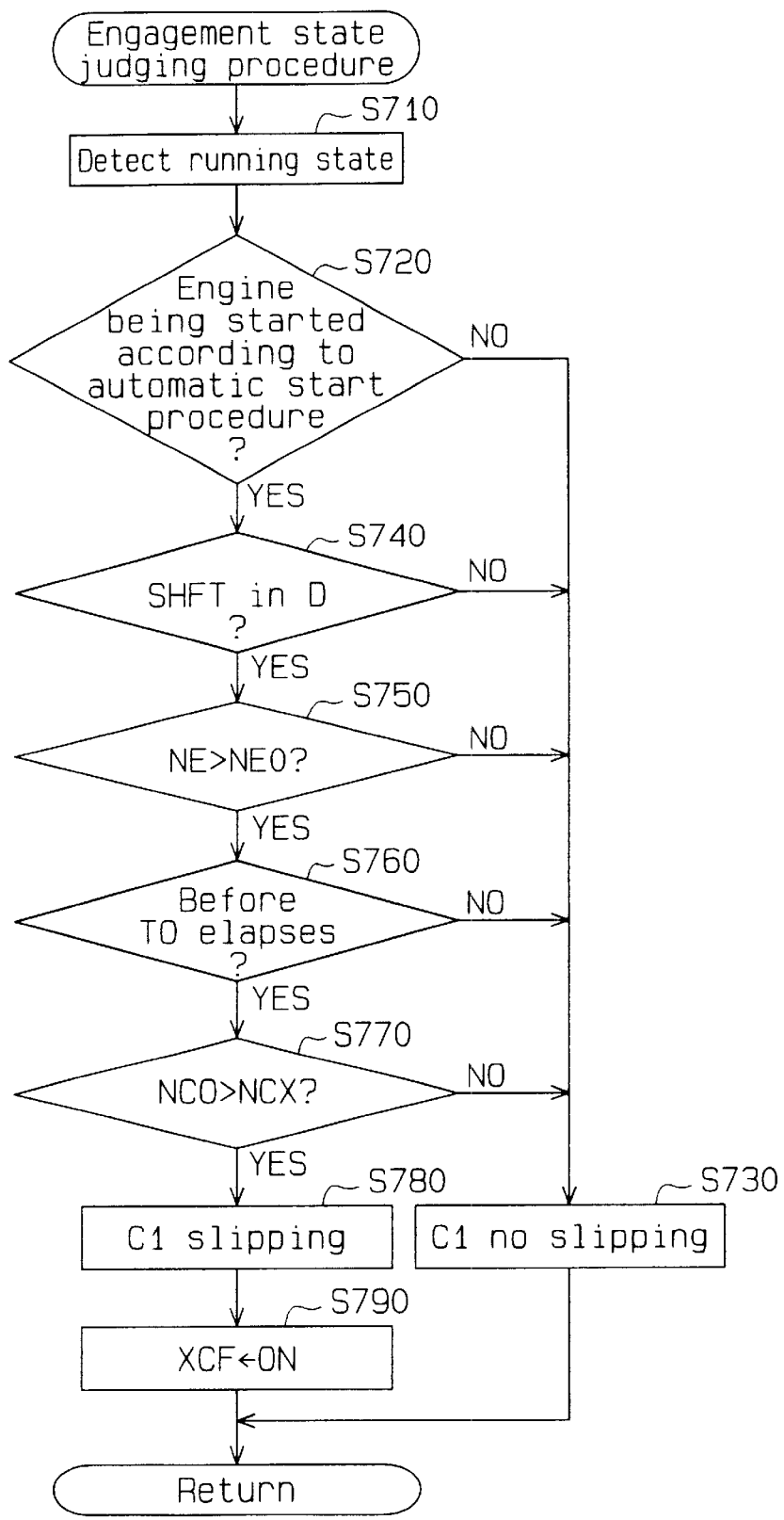
FIG. 13 is a flowchart showing a procedure executed by an ECU for determining the power transmitting state of the clutch according to a fourth embodiment.

A fourth embodiment of the present invention will be described with reference to FIGS. 13 to 14. The fourth embodiment is the same as the embodiment of FIGS. 1 to 10 except for step S350. That is, in the fourth embodiment, the equations (1) and (2) are not used. Instead, the result of the procedure of FIGS. 13, 14, or the detected engagement state of the clutch C1, is referred to in step S350. The procedure of FIG. 13 is executed at the same intervals as the procedure of FIG. 12. Steps S710 to S780 of FIG. 13 are the same as steps S610 to S680 of FIG. 12.

If the ECU 38 judges that the clutch C1 is slipping in step S780, the ECU 38 proceeds to step S790. In step S790, the ECU 38 sets an engagement abnormality flag XCV to ON and temporarily suspends the current routine.

Figure 14:
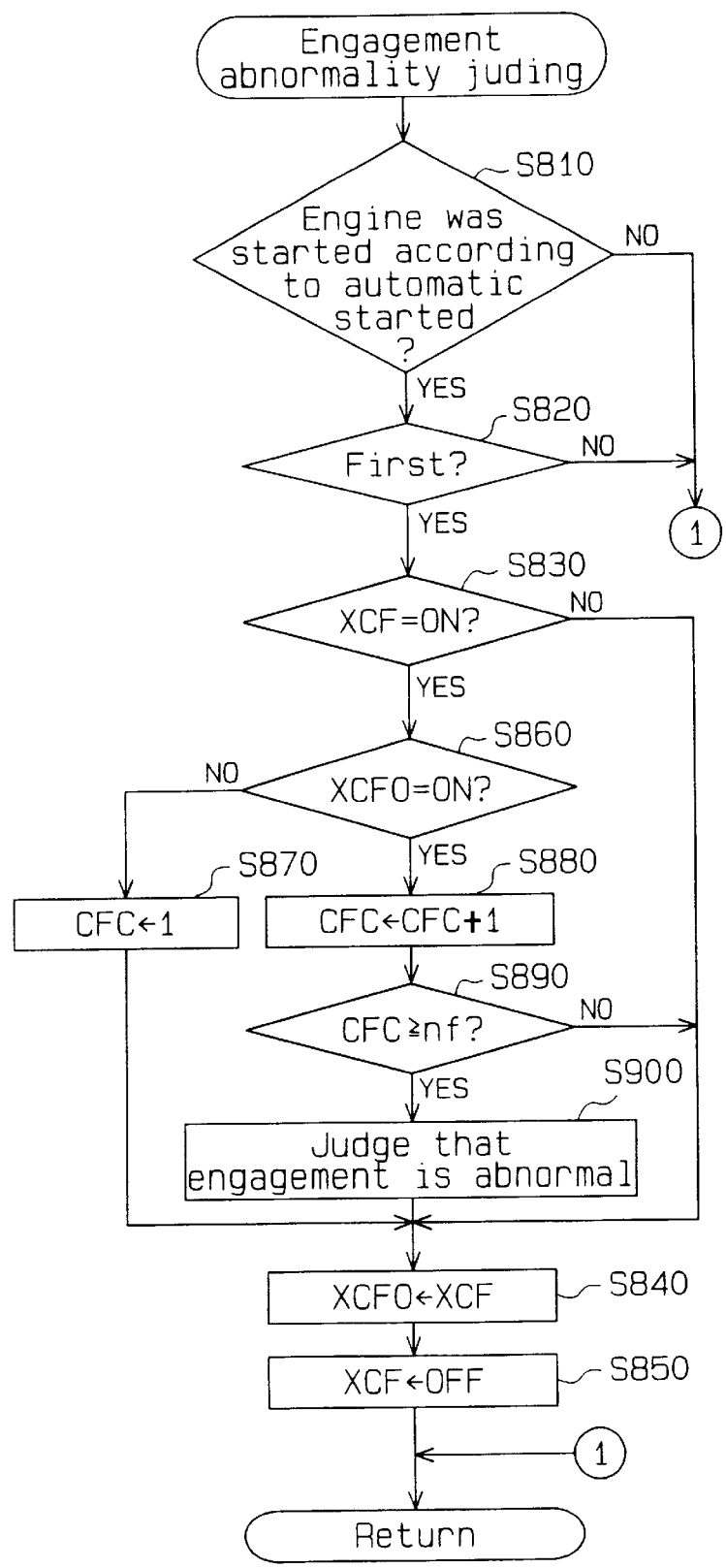
FIG. 14 is a flowchart showing a procedure executed by an ECU for determining that the transmitting state is abnormal.

The procedure of FIG. 14 is executed at predetermined intervals. In step S810, the ECU 38 judges whether the engine 2 has been automatically started. If the outcome of step S810 is negative, that is, if the engine 2 has not been automatically started, the ECU 38 temporarily suspends the current routine.

If the outcome of step S810 is positive, that is, if the engine 2 has been automatically started, the ECU 38 proceeds to step S820. In step S820, the ECU 38 detects whether the current routine is being executed for the first time after the engine 2 was automatically started. If the outcome of step S820 is positive, that is, if the current routine is being executed for the first time after the engine 2 was automatically started, the ECU 38 proceeds to step S830. In step S830, the ECU 38 judges whether the abnormality flag XCF is ON.

If the ECU 38 judges that the clutch C1 is not slipping in step S730 in FIG. 13, the abnormality flag XCF remains OFF. Therefore, the outcome of step S830 of FIG. 14 is negative and the ECU 38 proceeds to step S840. In step S840, the ECU 38 sets the value of the abnormality flag XCFO of the preceding automatic start procedure to the value of the abnormality flag XCF of the current automatic procedure. That is, the ECU 38 sets the preceding abnormality flag XCFO to OFF. In step S850, the ECU 38 sets the abnormality flag XCF to OFF and temporarily suspends the current routine.

Since the subsequent execution of the routine is not the first execution after the engine 2 was automatically started, the outcome of step S820 is negative, and the ECU 38 temporarily suspends the routine. Therefore, until the engine 2 is automatically started, the procedure of FIG. 14 will not be executed.

If the abnormality flag XCF is ON in step S790 of FIG. 13, the outcome of step S830 of FIG. 14 is positive, and the ECU 38 executes step S860. In step S860, the ECU 38 judges whether the abnormality flag XCFO of the preceding automatic start procedure is ON. That is, the ECU 38 judges whether the clutch C1 was slipping during the preceding automatic start procedure of the engine 2.

If the outcome of step S860 is negative, that is, if the abnormality flag XCFO was set to OFF in the preceding automatic start procedure (in other words, if the clutch C1 did not slip during the preceding automatic start procedure of the engine 2), the ECU 38 proceeds to step S870. In step S870, the ECU 38 sets a fail counter CFC to one and proceeds to step S840. In step S840, the ECU 38 sets the value of the abnormality flag XCFO of the preceding automatic start procedure to the value of the abnormality flag XCF of the current automatic start procedure, or to ON, and proceeds to step S850. In step S850, the ECU 38 sets the abnormality flag XCF to OFF and temporarily suspends the current routine.

If the outcome of step S860 is positive, that is, if the abnormality flag XCFO of the preceding automatic start procedure is ON (in other words, if the clutch C1 slipped during the preceding automatic start procedure of the engine 2), the ECU 38 proceeds to step S880. In step S880, the ECU 38 increases the value of the fail counter CFC. In step S890, the ECU 38 judges whether the fail counter CFC has exceeded an abnormality determination value nf. In the embodiment of FIG. 13 and 14, the abnormality determination value nf is set, for example, to three.

If the outcome of step S890 is negative, that is, if an inequality CFC<nf is satisfied, the ECU 38 proceeds to step S840. In step S840, the ECU 38 sets the value of the abnormality flag XCFO of the preceding automatic start procedure to the current abnormality flag XCF, or to ON. In a subsequent step S850, the ECU 38 sets the abnormality flag XCF to OFF and temporarily suspends the routine.

For example, if the clutch C1 slips every time the engine 2 is automatically started and the abnormality flag XCF is continually set to ON, the outcome of step S860 is positive. Then, the fail counter CF is increased in step S880.

If the outcome of step S890 is positive, that is, if an inequality CFC≧nf is satisfied, the ECU 38 proceeds to step S900. In step S900, the ECU 38 judges that the transmission state of the clutch C1 is abnormal. In a subsequent step S840, the ECU 38 sets the value of the abnormality flag XCFO of the preceding automatic start procedure to the value of the current abnormality flag XCF and proceeds to step S850. In step S850, the ECU 38 sets the abnormality flag to XCF to OFF and temporarily suspends the current routine.

Suppose that the abnormality flag XCF was set to ON in the two preceding automatic start procedures of the engine 2, since the clutch C1 slipped, and that the clutch C1 does not slip in the current automatic start. Since the clutch C1 is not slipping, the abnormality flag XCF is set to OFF. In this case, the outcome of step S830 is negative, and the abnormality flag XCFO of the preceding automatic start procedure is set to OFF. Thus, if the clutch C1 slips in the subsequent automatic start procedure of the engine 2, the outcome of step S860 will be negative. In step S870, the value of the fail counter CFC is reset to one. Therefore, the engagement state of the power transmission mechanism is judged to be abnormal when the ECU 38 judges that the clutch C1 is slipping in consecutive automatic start procedures the number of which corresponds to the abnormal determination value nf, which is three in this embodiment.

When the ECU 38 judges that the engagement state of the clutch C1 is abnormal, an abnormality in the hydraulic pressure controller 6a, which includes the clutch C1, an abnormality in the electric oil pump 36 or the abnormality in the hydraulic system between the controller 6a and the pump 36 is suspected. Therefore, when the power transmission system is judged to be abnormal, necessary procedures for dealing with the abnormality are performed. For example, a warning lamp of the vehicle, which is located on the dashboard, is lit to warn the driver of the abnormality, and the engine 2 is A third embodiment of the present invention will now be described with reference to FIG. 12. The embodiment of FIG. 12 is the same as the embodiment of FIGS. 1 to 10 except for step S350. That is, in the embodiment of FIG. 6, the equations (1) and (2) are not used. Instead, the result of the procedure of FIG. 12 for determining the engagement state of the clutch C1 is referred to in step S350. Unless specifically described, the embodiment of FIG. 12 is the same as the embodiment of FIGS. 1 to 10.

The procedure of FIG. 12 is. executed at predetermined intervals. In step S110, running state of the engine 2 is detected. For example, the coolant temperature THW, which is detected by the coolant temperature sensor 66, the depression state of the acceleration pedal, which is detected by the idle switch 50, the voltage of the battery 30, the depression state of the brake pedal, which is detected by the brake switch 64 and the vehicle speed SPD, which is computed based on the detection value of the first speed sensor 32, are stored in the RAM of the ECU 38. In step S610, the turbine speed NCO, the engine speed NE, the shift position SHFT are stored in the working area of the RAM of the ECU 38. In step S620,the ECU 38 judges whether the engine 2 is being automatically started. If the outcome of step S620 is negative, that is, if the engine 2 is not being automatically started, the ECU 38 proceeds to step S630. In step S630, the ECU 38 judges that the clutch C1 is not slipping and temporarily suspends the current routine.

If the outcome of step S620 is positive, that is, if the engine 2 is being automatically started, the ECU 38 proceeds to step S640. In step S640, the ECU 38 judges whether the shift position SHFT is D. If the outcome of step S640 is negative, or if the shift position SHFT is not D, the ECU 38 controlled in a limp-home procedure.

In addition to the advantages of the embodiment shown in FIG. 12, the embodiment of FIGS. 13 and 14 has the following advantages.

The clutch C1 is judged to be slipping when there is not sufficient hydraulic pressure during the automatic start of engine due to a temporary malfunction of the hydraulic controller 6a or the electric oil pump 36 or due to a temporary malfunction of the clutch C1. In this case, however, the clutch C1 is rarely judged to be slipping in consecutive executions of detection. The clutch C1 is rarely judged to slip a number of times that corresponds to the abnormality determination value nf (three in this embodiment). Therefore, if the clutch C1 is judged to slip for more than the number of times set by the value nf, the hydraulic controller 6a, the electric pump 36 or the clutch C1 is judged to be abnormal.

Thus, the abnormality of the engagement of the clutch C1 is reliably detected by the procedure shown in FIG. 14. Further, when the engagement of the clutch C1 is detected to be abnormal, the driver is warned and the limp-home control procedure is started. In other words, necessary measures are executed at an early stage.

Figure 15:
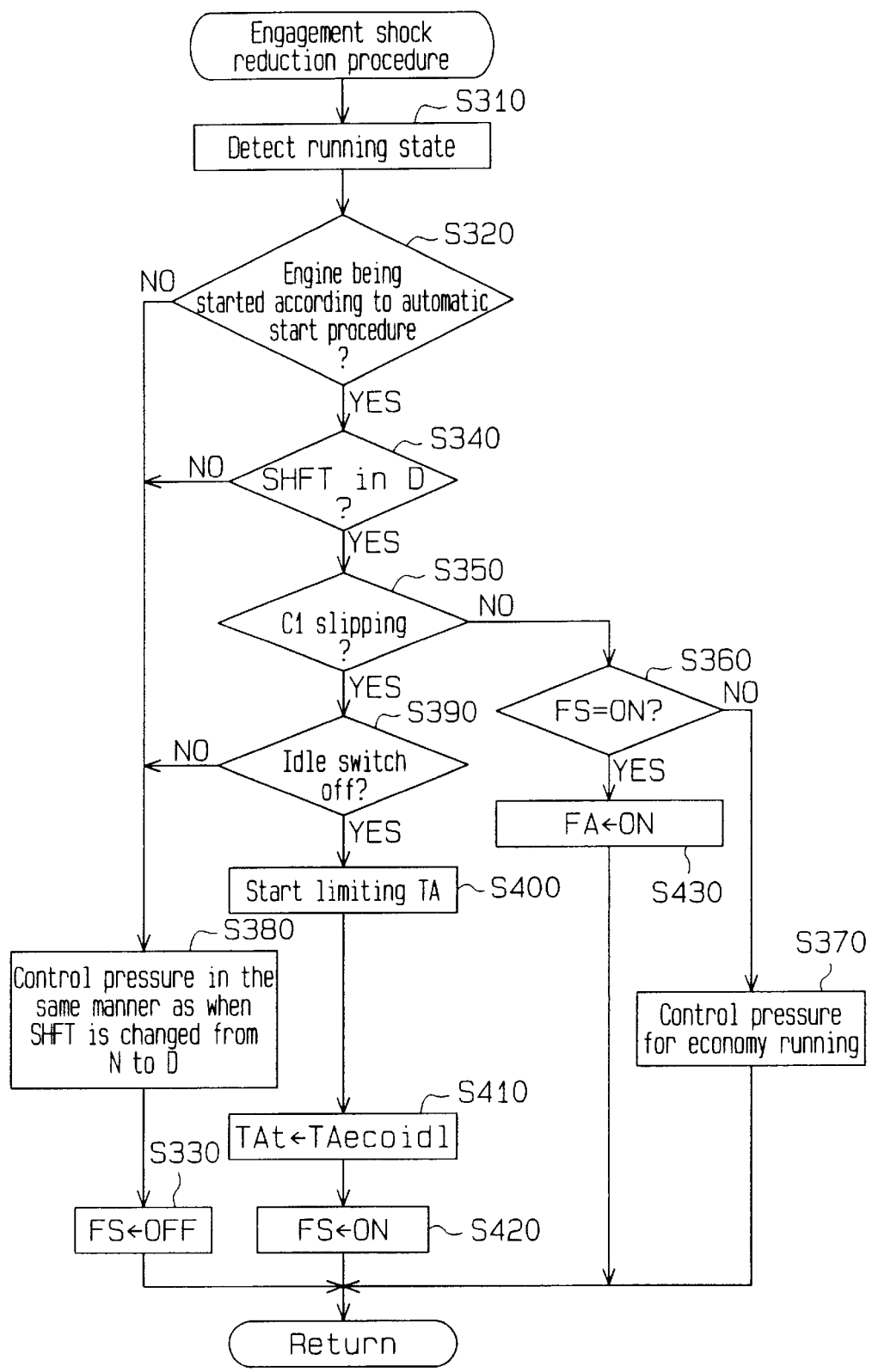
FIG. 15 is a flowchart showing a procedure like FIG. 6, according to a fifth embodiment.

A fifth embodiment of the present invention will now be described with reference to FIG. 15. The same reference numerals are given to those steps that are the same as the corresponding steps of the routine of FIG. 6. In the embodiment of FIG. 15, when the idle switch 50 is on, that is, when the outcome of step S390 is negative, the duty ratio of the electromagnetic valve is controlled. In this embodiment, when the idle switch 50 is off, the shock of engagement of the clutch C1 is reduced only by limiting the throttle opening degree TA.

Figure 16:
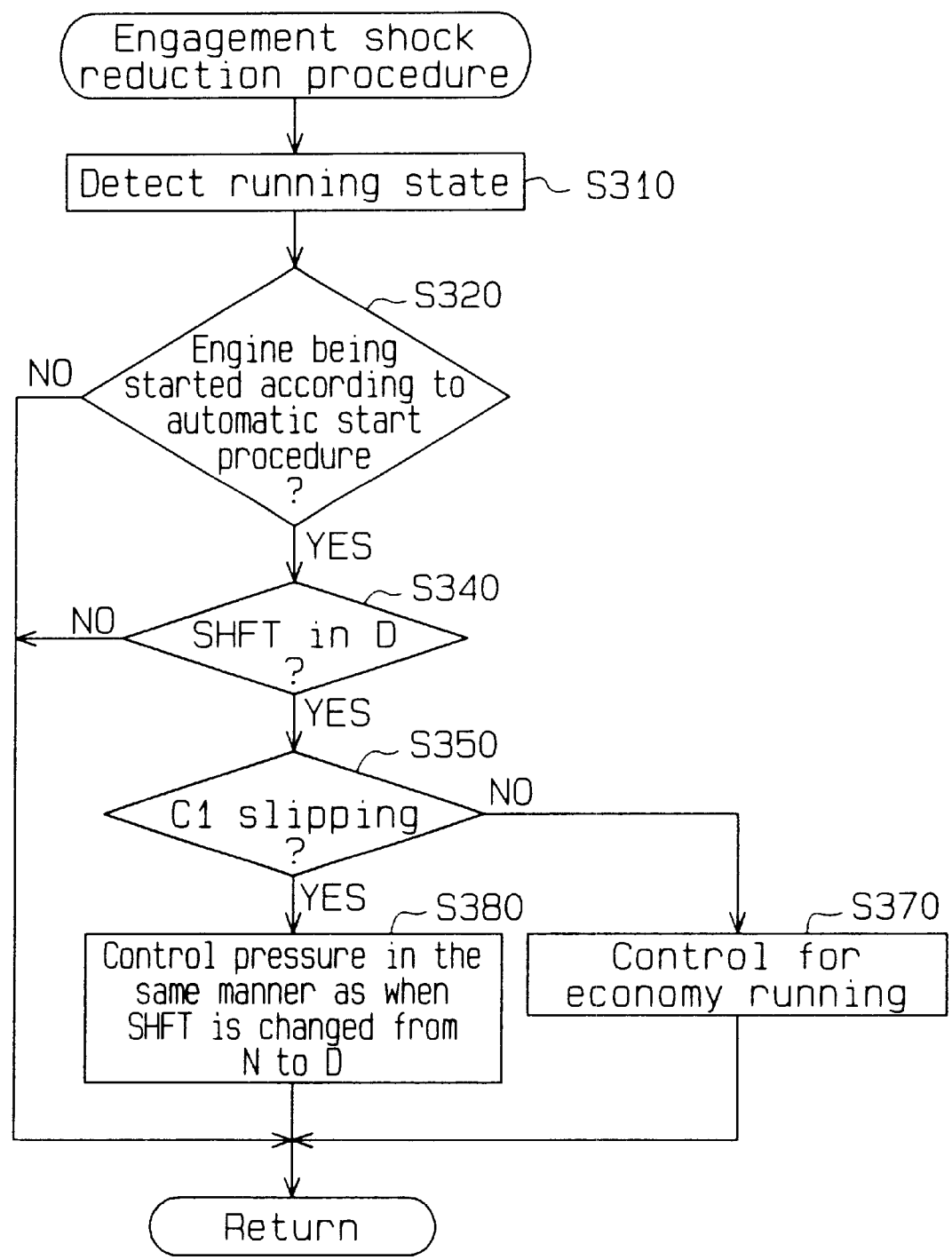
FIG. 16 is a flowchart showing a procedure like FIG. 6, according to a sixth embodiment.

A sixth embodiment of the present invention will now be described with reference to FIG. 16. The same reference numerals are given to those steps that are the same as the corresponding steps of the routine of FIG. 6. In the embodiment of FIG. 16, when the clutch C1 slips, step S380 is performed, that is, duty ratio of the electromagnetic valve is controlled, and the throttle opening degree TA is not limited. Therefore, shock due to the engagement of the clutch C1 is reduced only by controlling the hydraulic pressure applied to the automatic transmission 6, which simplifies the control procedure.

It should be apparent to those skilled in the art that the present invention may be embodied in many other specific forms without departing from the spirit or scope of the invention. Particularly, it should be understood that the invention may be embodied in the following forms.

In the embodiments of FIGS. 1 to 16, the amount of fuel supplied to the engine 2 may be reduced for reducing the shock of the engagement of the clutch C1. For example, in a lean burn engine such as a cylinder injection type gasoline engine or in a diesel engine, the fuel supply amount may be minimized when the clutch C1 is slipping. In this case, when the clutch C1 stops slipping, the fuel supply amount is gradually increased to a normal level.

The output torque may be prevented from increasing by prohibiting the target value TAt of the throttle opening TA from increasing. Alternatively, the speed of increase of the target value TAt may be limited so that the target value TAt is increased slowly. Accordingly, the increase of the output torque is limited.

The embodiment of FIGS. 1 to 10 may be applied to an automatic transmission in which an electric oil pump supplies hydraulic pressure to a hydraulic pressure controller not only during automatic stop procedure but also when the engine is running. In this type of automatic transmission, if sufficient electricity cannot be supplied to the electric oil pump due to, for example, a malfunction of the battery after the engine is automatically stopped, a shock may be generated when the engine is automatically started. This is because electricity is suddenly supplied to the electric oil pump from a motor-generator. If applied, the procedure of the embodiment shown in FIGS. 1 to 10 reduces such shock.

In step S660 of FIG. 12 and in step S760 of FIG. 13, whether the vehicle speed SPD has exceeded a reference speed value (for example 4 km/h) may be judged. In this case, if the vehicle speed SPD is less than the reference value in steps S660, S760, the outcome is positive. The speed NAO of the output shaft 6b of the automatic transmission 6, which is detected by the first speed sensor 32, represents the vehicle speed SPD. The speed NAO may be used as the vehicle speed SPD.

The outcome of steps S660 and S760 may be positive either when the reference period T0 has not elapsed or when the vehicle speed SPD is less than the reference speed. Steps S660 and S670 may be more strict. Specifically, the outcome of steps S660 and S670 may be positive when the reference period T0 has not elapsed and the vehicle speed SPD is less than the reference speed.

In step S680 of FIG. 12 and in step S780 of FIG. 13, the ECU 38 may compute a cumulative number of rotations of the input shaft 6c based on the output of the second rotation speed sensor 34, after the automatic start of the engine 2 is started, and may judge that the clutch C1 is slipping if the cumulative number of rotation exceeds a reference-number. In this case, the number of rotation is, for example, the cumulative number of e turbine after the engine 2 was automatically started or after the speed NE exceeded the reference speed NE0.

In step S670 of FIG. 12 and in step S770 of FIG. 13, the ECU 38 may judge whether the equation (2) of the embodiment shown in FIGS. 1 to 10 is satisfied or whether the equation (5), which will be discussed below, is satisfied.

In step S660 of FIG. 12 or in step S670 of FIG. 13, the reference period T0 may be started when the inequality NE>NEO is satisfied in step S750.

The second speed sensor 34 may directly detect the speed of the input shaft 6c of the automatic transmission 6.

In step S350 of FIGS. 6, 12 and 13, the ECU 38 may judge that the clutch C1 is slipping if the following equation (4) is satisfied and may judge that the clutch C1 is slipping when the following equation (5) is satisfied.

$$NCO \leq NAO \times Gr + \alpha \quad (4)$$

$$NCO > NAO \times Gr + \alpha \quad (5)$$

In the equations (4) and (5), the value α represents an acceptable level of the difference between the value detected by the second speed sensor 34 and the value detected by the first speed sensor 32 when the clutch C1 is not slipping.

The value a may be relatively great. In this case, when the clutch C1 is substantially completely engaged from a non-engaged state, the outcome of step S350 in FIG. 6 is negative.

The hydraulic pressure applied to the clutch C1, the hydraulic pressure generated by the oil pump 36 or the hydraulic pressure generated by the accumulator 136 may be detected, and when the detected pressure is lower than a reference value, the ECU 38 may judge that the clutch C1 is not effectively transmitting power.

Therefore, the present examples and embodiments are to be considered as illustrative and not restrictive and the invention is not to be limited to the details given herein, but may be modified within the scope and equivalence of the appended claims.

What is claimed is:

1. An automatic start controlling apparatus for automatically starting an internal combustion engine coupled to a transmission, wherein the transmission has an input shaft connected to the engine, an output shaft, and a clutch located between the input and output shafts, wherein the clutch is engaged to transmit the output torque of the engine from the input shaft to the output shaft, wherein the clutch is actuated by a drive source other than the engine when the engine stops, and the automatic start controlling apparatus has a controller, and when the engine is automatically started, the controller detects whether the clutch is completely engaged, and when the controller judges that the clutch is partially engaged, the controller reduces the output torque of the engine or limits an increase of the output torque.

2. The automatic start controlling apparatus according to claim 1, wherein, when the clutch is substantially completely engaged, the controller gradually stops reducing the output torque of the engine or stops limiting the increase of the output torque.

3. The automatic start controlling apparatus according to claim 1, wherein the controller reduces an intake air amount to the engine to reduce the output torque of the engine or limits an increase of the intake air amount to limit an increase of the output torque.

4. The automatic start controlling apparatus according to claim 1, wherein the controller reduces a fuel supply amount to the engine to reduce the output torque of the engine or limits an increase of the fuel supply amount to limit an increase of the output torque.

5. The automatic start controlling apparatus according to claim 1, wherein, when the running state of the engine satisfies an automatic stop condition, the engine is automatically stopped, wherein, when the running state of the engine satisfies an automatic start condition, the engine is automatically started.

6. The automatic start controlling apparatus according to claim 1, wherein, when the engine stops, the drive source supplies an accumulated energy to the clutch.

7. The automatic start controlling apparatus according to claim 1, wherein the drive source is an electric oil pump, which is connected to a battery, and when the engine stops, the electric oil pump is driven by the battery and supplies fluid to the clutch.

8. The automatic start controlling apparatus according to claim 1, wherein the controller detects whether the clutch is completely engaged based on the rotation speed of the input shaft, the rotation speed of the output shaft and a gear ratio of the transmission.

9. The automatic start controlling apparatus according to claim 1, wherein the controller detects whether the clutch is completely engaged based on the rotation of the input shaft of the transmission.

10. An automatic start controlling apparatus for automatically starting an internal combustion engine coupled to a transmission, wherein the transmission has an input shaft connected to the engine, an output shaft, and a clutch located between the input and output shafts, wherein the clutch is engaged to transmit the output torque of the engine from the input shaft to the output shaft, wherein the clutch is actuated by a drive source other than the engine when the engine stops, the automatic start controlling apparatus comprising:

a detecting means for detecting whether the clutch is completely engaged when the engine is automatically started while the drive source actuates the clutch to engage the clutch; and a torque control means for reducing the output torque of the engine or limiting an increase of the output torque when the detecting means detects that the clutch is partially engaged.

11. The automatic start controlling apparatus according to claim 10, wherein, when the clutch is substantially completely engaged, the torque control means gradually stops reducing the output torque of the engine or stops limiting the increase of the output torque.

12. The automatic start controlling apparatus according to claim 10, wherein the drive source is an electric oil pump, which is connected to a battery, and when the engine stops, the electric oil pump is driven by the battery and supplies fluid to the clutch.

13. The automatic start controlling apparatus according to claim 10, wherein the detecting means detects an engagement state of the clutch based on the rotation speed of the input shaft, the rotation speed of the output shaft and a gear ratio of the transmission.

14. The automatic start controlling apparatus according to claim 10, wherein the detecting means detects an engagement state of the clutch based on the rotation of the input shaft of the transmission.

15. An automatic start controlling apparatus for automatically starting an internal combustion engine coupled to a transmission, wherein the transmission has an input shaft connected to the engine, an output shaft, and a clutch located between the input and output shafts, wherein the clutch is engaged to transmit the output torque of the engine from the input shaft to the output shaft, wherein the clutch is actuated by a drive source other than the engine when the engine stops, and the automatic start controlling apparatus has a controller, and when the engine is automatically started, the controller detects whether the clutch is completely engaged, and when the controller detects that the clutch is partially engaged, the controller controls the clutch to gradually and completely engage.

16. The automatic start controlling apparatus according to claim 15, wherein, when the running state of the engine satisfies an automatic stop condition, the engine is automatically stopped, wherein, when the running state of the engine satisfies an automatic start condition, the engine is automatically started.

17. The automatic start controlling apparatus according to claim 15, wherein, when the engine stops, the drive source supplies an accumulated energy to the clutch.

18. The automatic start controlling apparatus according to claim 15, wherein the drive source is an electric oil pump, which is connected to a battery, and when the engine stops, the electric oil pump is driven by the battery and supplies fluid to the clutch.

19. The automatic start controlling apparatus according to claim 15, wherein the controller detects an engagement state of the clutch based on the rotation speed of the input shaft, the rotation speed of the output shaft and a gear ratio of the transmission.

20. The automatic start controlling apparatus according to claim 15, wherein the controller detects an engagement state of the clutch based on the rotation of the input shaft of the transmission.

21. A detecting apparatus for detecting an engagement state of a clutch, wherein the clutch is included in a transmission coupled to an internal combustion engine, wherein the transmission has an input shaft, which is connected to the engine, and an output shaft, wherein the clutch is located between the input shaft and the output shaft and is engaged to transmit the output torque of the engine from the input shaft to the output shaft, wherein the clutch is actuated by a drive source other than the engine when the engine stops, the detecting apparatus comprising:

a determining means for determining whether the running state of the engine satisfies a predetermined automatic start condition while the drive source actuates the clutch to engage the clutch; and a detecting means for detecting whether the clutch is completely engaged based on the rotation of the input shaft of the transmission when the determining means determines that the condition is satisfied.

22. The detecting apparatus according to claim 21, wherein, when the rotation speed of the input shaft of the transmission is greater than a predetermined value, the detecting means detects that the clutch is partially engaged.

23. The detecting apparatus according to claim 21, wherein, when a cumulative number of the rotations of the input shaft of the transmission is grater than a predetermined value, the detecting means detects that the clutch is partially engaged.

24. The detecting apparatus according to claim 21, wherein the detecting means detects an engagement state of the clutch during a predetermined period measured from when the determining means determines that the automatic start condition is satisfied.

25. The detecting apparatus according to claim 21, wherein the detecting means detects the engagement state of the clutch from when the determining means determines that the automatic start condition has been satisfied until when the speed of a vehicle in which the apparatus is installed exceeds a predetermined value.

26. The detecting apparatus according to claim 21, wherein, when the rotation speed of the engine reaches a predetermined value, the determining means determines that the automatic start condition is satisfied.

27. The detecting apparatus according to claim 21 further comprising determining means, and when the detecting means consecutively detects that the clutch is partially engaged more than a predetermined number of times, the determining means determines that one of the transmission or the drive source is abnormal.

28. A detecting apparatus for detecting an engagement state of a clutch, wherein the clutch is included in a transmission coupled to an internal combustion engine, wherein the transmission has an input shaft connected to the engine, an output shaft, wherein the clutch is located between the input shaft and the output shaft, and is engaged to transmit the output torque of the engine from the input shaft to the output shaft, wherein the clutch is actuated by a drive source other than the engine when the engine stops, the detecting apparatus comprising:

a determining means for determining whether the running state of the engine satisfies a predetermined automatic start condition while the drive source actuates the clutch to engage the clutch; and a detecting means for detecting whether the clutch is completely engaged based on the rotation speed of the input shaft, the rotation speed of the output shaft and a gear ratio of the transmission when the determining means determines that the condition is satisfied.

29. The detecting apparatus according to claim 28, wherein the detecting means detects engagement of the clutch by comparing the rotation speed of the input shaft with a product of the rotation speed of the output shaft and the gear ratio of the transmission.

30. The detecting apparatus according to claim 28, wherein the detecting means detects the engagement state of the clutch during a predetermined period measured from when the determining means determines that the automatic start condition is satisfied.

31. The detecting apparatus according to claim 28, wherein the detecting means detects the engagement state of the clutch from when the determining means determines that the automatic start condition has been satisfied until when the speed of a vehicle in which the apparatus is installed exceeds a predetermined value.

32. The detecting apparatus according to claim 28, wherein, when the rotation speed of the engine reaches a predetermined value, the determining means determines that the automatic start condition is satisfied.

33. The detecting apparatus according to claim 28 further comprising determining means, and when the detecting means consecutively detects that the clutch is partially engaged more than a predetermined number of times, the determining means determines that one of the transmission or the drive source is abnormal.

34. An automatic start controlling apparatus for automatically starting an internal combustion engine coupled to a transmission, wherein the transmission has an input shaft connected to the engine, an output shaft, and a clutch located between the input and output shafts, wherein the clutch is engaged to transmit the output torque of the engine from the input shaft to the output shaft, wherein the clutch is actuated by a drive source other than the engine when the engine stops, the automatic start controlling apparatus comprising:

a detecting means for detecting whether the clutch is completely engaged when the engine is automatically started while the drive source actuates the clutch to engage the clutch;

a torque control means for reducing the output torque of the engine or limiting an increase of the output torque when the detecting means detects that the clutch is partially engaged; and a control means for controlling the clutch to gradually and completely engage when the detecting means detects that the clutch is partially engaged.

35. A method for automatically starting an internal combustion engine coupled to a transmission, wherein the transmission has an input shaft connected to the engine, an output shaft, and a clutch located between the input and output shafts, wherein the clutch is engaged to transmit the output torque of the engine from the input shaft to the output shaft, the method comprising:

actuating the clutch by a drive source other than the engine when the engine stops;

detecting whether the clutch is completely engaged when the engine is automatically started; and reducing the output torque of the engine or limiting an increase of the output torque when detecting detects that the clutch is partially engaged.

36. A method for automatically starting an internal combustion engine coupled to a transmission, wherein the transmission has an input shaft connected to the engine, an output shaft, and a clutch located between the input and output shafts, wherein the clutch is engaged to transmit the output torque of the engine from the input shaft to the output shaft, the method comprising:

actuating the clutch by a drive source other than the engine when the engine stops;

detecting whether the clutch is completely engaged when the engine is automatically started; and controlling the clutch to gradually and completely engage when the detecting detects that the clutch is partially engaged.

37. A detecting method for detecting an engagement state of a clutch, wherein the clutch is included in a transmission coupled to an internal combustion engine, wherein the transmission has an input shaft, which is connected to the engine, and an output shaft, wherein the clutch is located between the input shaft and the output shaft and is engaged to transmit the output torque of the engine from the input shaft to the output shaft, the method comprising:

actuating the clutch by a drive source that differs from the engine when the engine stops;

determining whether the running state of the engine satisfies a predetermined automatic start condition while the drive source actuates the clutch to engage the clutch; and detecting whether the clutch is completely engaged based on the rotation of the input shaft of the transmission when determining that the condition is satisfied.

38. A detecting method for detecting an engagement state of a clutch, wherein the clutch is included in a transmission coupled to an internal combustion engine, wherein the transmission has an input shaft, which is connected to the engine, and an output shaft, wherein the clutch is located between the input shaft and the output shaft and is engaged to transmit the output torque of the engine from the input shaft to the output shaft, the method comprising:

actuating the clutch by a drive source that differs from the engine when the engine stops;

determining whether the running state of the engine satisfies a predetermined automatic start condition while the drive source actuates the clutch to engage the clutch; and detecting whether the clutch is completely engaged based on the rotation speed of the input shaft, the rotation speed of the output shaft and a gear ratio of the transmission when determining that the condition is satisfied.

* * * * *